United States Patent [19]

Majette et al.

[11] Patent Number: 4,789,874
[45] Date of Patent: Dec. 6, 1988

[54] SINGLE CHANNEL ENCODER SYSTEM

[75] Inventors: Mark W. Majette; William J. Walsh, both of San Diego; John A. Wickeraad, Loomis, all of Calif.

[73] Assignee: Hewlett-Packard Company, Palo Alto, Calif.

[21] Appl. No.: 77,575

[22] Filed: Jul. 23, 1987

[51] Int. Cl.$^4$ ............................................. G01D 15/24
[52] U.S. Cl. ........................ 346/140 R; 250/231 SE; 318/640; 400/126; 400/320
[58] Field of Search ................. 346/140, 75, 139 R; 250/237 G, 231 SE; 318/640; 400/126, 320, 705.1

[56] References Cited

U.S. PATENT DOCUMENTS 4,313,684  2/1982  Tazaki ............................ 346/140 X
4,628,609 12/1986  Rieder ........................ 250/237 G X
4,709,245 11/1987  Piatt ................................. 346/140

OTHER PUBLICATIONS

Bishop et al; Carrier Reference Determination for Ink Jet Printers, IBM TDB, vol. 21, No. 12, May 1979, pp. 4928-4929.

Primary Examiner—Joseph W. Hartary

[57] ABSTRACT

A control system providing a control of position, velocity, and direction of movement of a member in an axis of freedom which employs a scale having scale divisions thereon and bands or zones defining limits of constant velocity control, acceleration and deceleration zone limits, and a rest or parking position. The scale spans and parallels the axis of freedom. A single channel transducer or encoder mounted on and moving with the member produces time varying output signals in response to the sensing of scale divisions along the scale and signals of different characteristic in response to encoder sensing of the limit bands. The time varying output signals are employed as scale division count signals for position determination and as scale division count signals per unit of time, for velocity feedback. The signals of different characteristic produced upon entering and during crossing of the limit bands, are utilized in a system of logic for computing control system signals to compensate control uncertainties in differing functional modes of the control system.

17 Claims, 15 Drawing Sheets

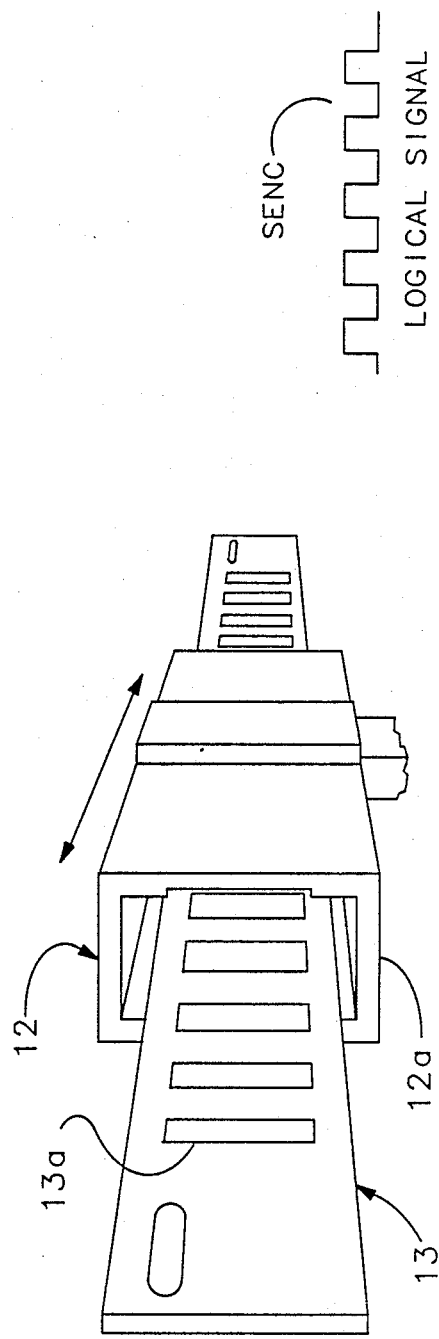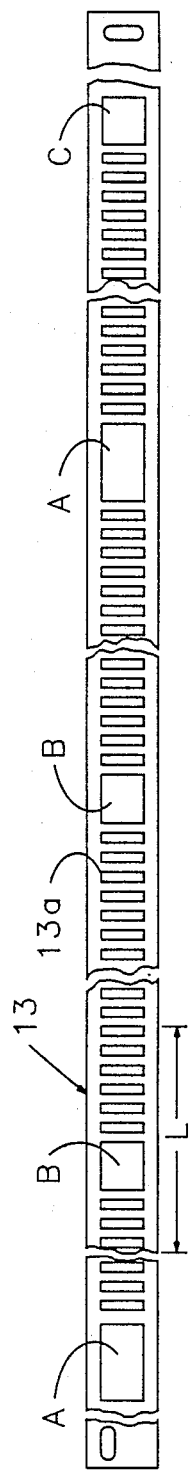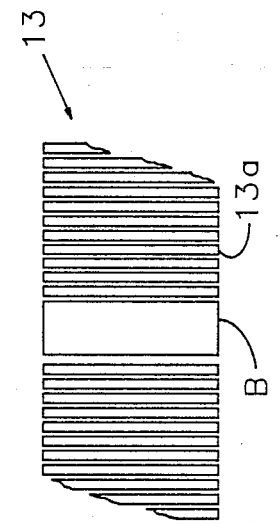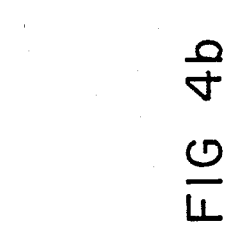
FIG 2a
FIG 2
FIG 4a
FIG 4b

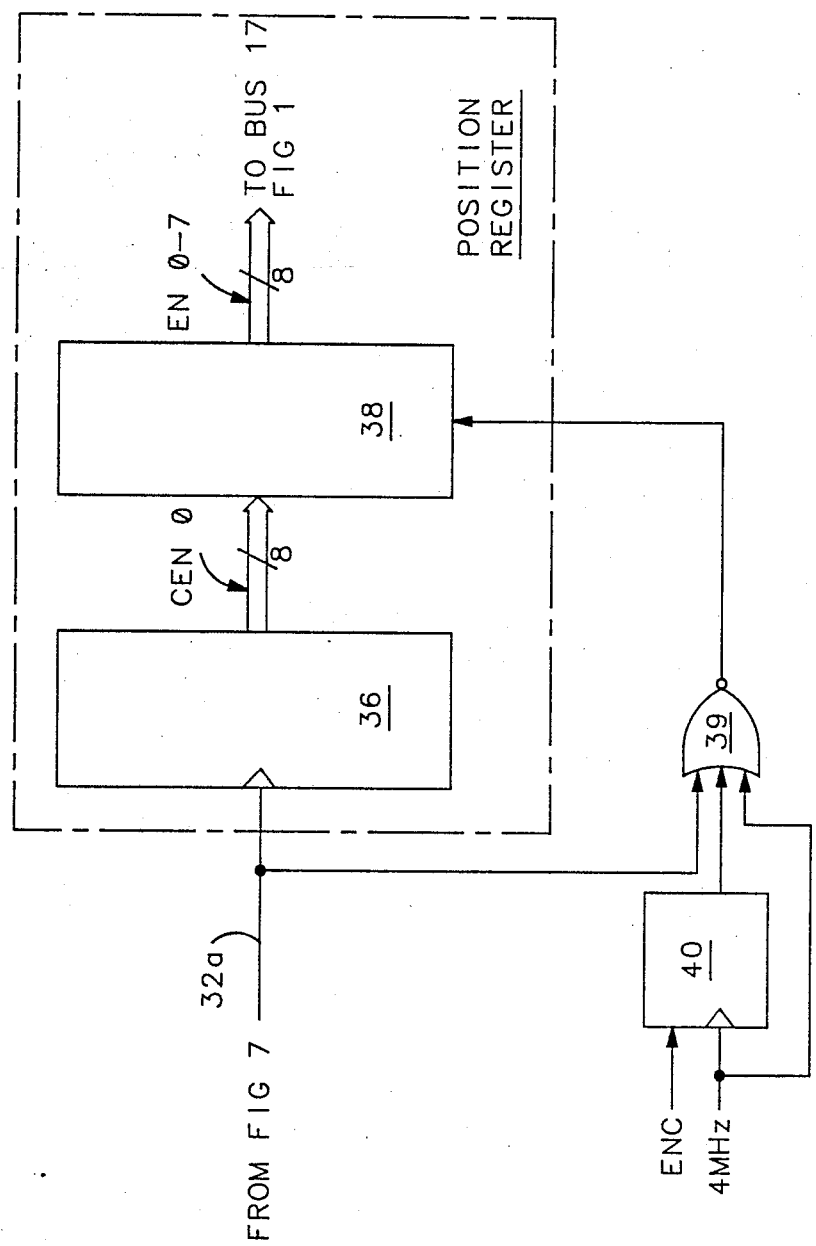

SINGLE CHANNEL ENCODER SYSTEM

TECHNICAL FIELD

This invention relates to a method and apparatus employing digital techniques for controlling the movement and position of a member in an axis of freedom, as in printers, plotters and machine tools.

BACKGROUND ART

Such systems of control usually employ magnetic or optical transducers or encoders for resolving the scale divisions of either linear or rotary scales. Linear scales are usually fixed in positions paralleling and spanning the axis of freedom, and, the scale reader or encoder rides on the carriage in that axis in a position to read the scale. Rotary scales are usually driven by the screw which drives the carriage in the axis or by the drive motor therefor.

Two encoders have usually been employed in resolving such scales. U.S. Pat. No. 2,848,698 describes an incremental position detector comprising a magnetic scale and two magnetic heads in quadrature spaced relationship with respect to the grooves in the scale. The grooves define the scale divisions. These magnetic heads individually produce time varying voltages. These voltages are in quadrature phase relationship. The voltages are logically processed to produce square or rectangular quadrature phased voltages which are useful in determining carriage position, velocity and direction of movement in the axis of freedom. U.S. Pat. No. 3,245,144 which describes a machine tool control, with particular reference to FIGS. 19, 137, and 143 and the related text, describes a system for logically processing the quadrature phase voltages derived from magnetic heads scanning a linear scale in a machine axis, for controlling movement and position of a machine tool carriage in that axis. U.S. Pat. No. 3,262,105 applies such principals to a rotary scale, adding the provision of an index mark defining the start of the rotary scale. The system uses the index signal or voltage derived from the index mark and the scale division count thereafter for defining carriage position and/or velocity and direction of movement.

All of the systems of these patents employ two magnetic heads in resolving the linear or rotary scales. All of them employ or are intended for use with systems of logic responsive to the instantaneous electrical states of the signals or voltages of the magnetic heads for determining the direction of movement in the axis, and for determining position by counting scale divisions, using the voltage state relationship of the two signals at particular intervals of time. When two magnetic heads are employed in quadrature phase position relationship along the scale, one or the other of the heads will always change electrical state when movement occurs. When the electrical outputs of both magnetic heads are simultaneously high, the voltage of one will drop depending upon which direction the magnetic head assembly has been moved. If both magnetic heads are in their low voltage states, the voltage of one magnetic head will go high, depending on the direction of movement. When one magnetic head is in the higher of its two voltage states and the other in the lower voltage state, the start of movement in one direction will cause the magnetic head in the higher of its two voltages to switch to the lower of its two voltage states while the voltage of the other magnetic head in the lower of its two voltage states remains unchanged. When movement starts in the reverse direction the magnetic head in the lower of its two voltage states switches to its higher voltage state while the magnetic head in the higher voltage state remains in the higher of its two voltage states.

The logical processing of these signals may be accomplished by complementing the output signals so that the output signals and their compliments exist simultaneously. Next, pulses are produced by differentiating the output signals and their compliments. Thereafter the pulses are selectively combined with the output signals and the complemented output signals to produce 4 count pulses per scale division in separate count pulse sets for each direction of displacement. By such an expedient, the system measures position and determines the direction of movement. The rate of count pulse production is of course an indication of the rate of movement.

With such arrangements when a single scale is used, the two heads must be precisely positioned to include one quarter of a scale division spacing. Where two scales are employed, one for each head either the heads or the scales may be displaced to include one quarter of a scale division of spacing. It is apparent that the use of multiple heads and/or scales adds to the cost of the incremental encoder. The additional parts in such an encoder arrangement increases the probability of failure. The logical processing of these quadrature signals, such as discussed above, including differentiating of the signals and the complementing of the encoder produced signals, together with the necessary circuits for logically combining these signals, adds to cost and to the parts count and the likelihood of failure.

DISCLOSURE OF THE INVENTION

While such prior art incremental encoder systems have been usefully employed in many applications, there is a need to simplify the encoders per se as well as the systems associated therewith. Simplification is achieved according to this invention by using a single channel incremental position encoder. As employed herein, single channel means the use of a single linear scale and a single encoder or detector transducing or reading scale divisions. In a printer or plotter, for example, the linear scale is disposed in a position paralleling and spanning the carriage axis and the encoder body is mounted on the movable carriage in a position to scan the scale as the carriage is moved. An optical transducer or detector in the encoder body responds to the scale divisions, producing a time varying electrical output indicative of the individual scale divisions. The control system for controlling movement of the carriage employs this single channel incremental position encoder as the only feedback element. Work data, such as printing or plotting data, supplied to the system causes the generation of a desired, or reference, position. Processing of such position information according to a specific control law results in control signals representing desired position which are employed to operate the carriage drive motor. In the control system, the desired position is compared with the feedback from the single channel incremental position encoder, which represents the actual position of the carriage, to control the carriage drive. The system provides control of the rate of movement of the carriage in its axis, the position of the carriage in its axis, the sweep of the carriage, reversal of carriage movement, and its acceleration to printing or plotting speed, as well as movement of the carriage into a rest or park position.

In one application, the encoder scale is a transparent strip having narrow, opaque, transverse lines thereon at regularly spaced intervals throughout the printing or plotting stroke of the carriage in the axis. Opaque areas, called print limit marks or bands, of larger dimension measured longitudinally of the scale, are provided at each end of the printing or plotting stroke on the scale. Beyond these printing or plotting limit marks on the scale, additional marks or bands are provided. These are called the sweep limit bands or marks where carriage reversal takes place. Additional opaque lines are provided, of the same dimension and spacing as those of the scale divisions between the printing or plotting limit marks, between the print and sweep limit bands. These are the regions on the scale within which the carriage is decelerated or accelerated. The carriage is stopped and reversed in the sweep limit band. Beyond the sweep limit band on one end of the scale, is an additional scale section comprising opaque scale divisions and a rest or part band or mark on the scale in which the carriage may be moved during periods of inactivity. The print or plot limit bands, the sweep limit bands and the rest or park limit bands constitute absolute positions or limits of carriage movement identified by the change of signal output of the encoder from the time varying signal developed while scanning the scale divisions, to a signal which remains constant over a predetermined interval after entering and while traversing a limit band. The system is responsive to such signal changes for controlling carriage movement.

Since the scale divisions are coarse in relation to requirements for carriage control and for work to be performed, such as printing, provision is made in the system for resolving the scale in a finer degree for carriage control and for printing or plotting purposes. Such provisions include an arrangement for producing the equivalent of 2 scale counts per scale division for printing or plotting and 4 scale counts per scale division for control purposes, for example.

Other improvements and advantages will become apparent from a study of the following specification when considered in conjunction with the accompanying drawings in which:

FIG. 2 is a perspective view of an encoder embodying the principals of this invention;

FIG. 4a is an enlarged fragmentary view of an encoder scale according to this invention;

FIG. 4b is an enlarged detail of the encoder scale at location L of FIG. 4a, and which is drawn approximately to scale;

FIGS. 5b and 5c depict idealized differing detector or encoder signal outputs aligned with the scale divisions of FIG. 5a;

FIG. 6b illustrates a typical detector output signal aligned with the scale divisions of the encoder scale of FIG. 6a;

Figure 7:
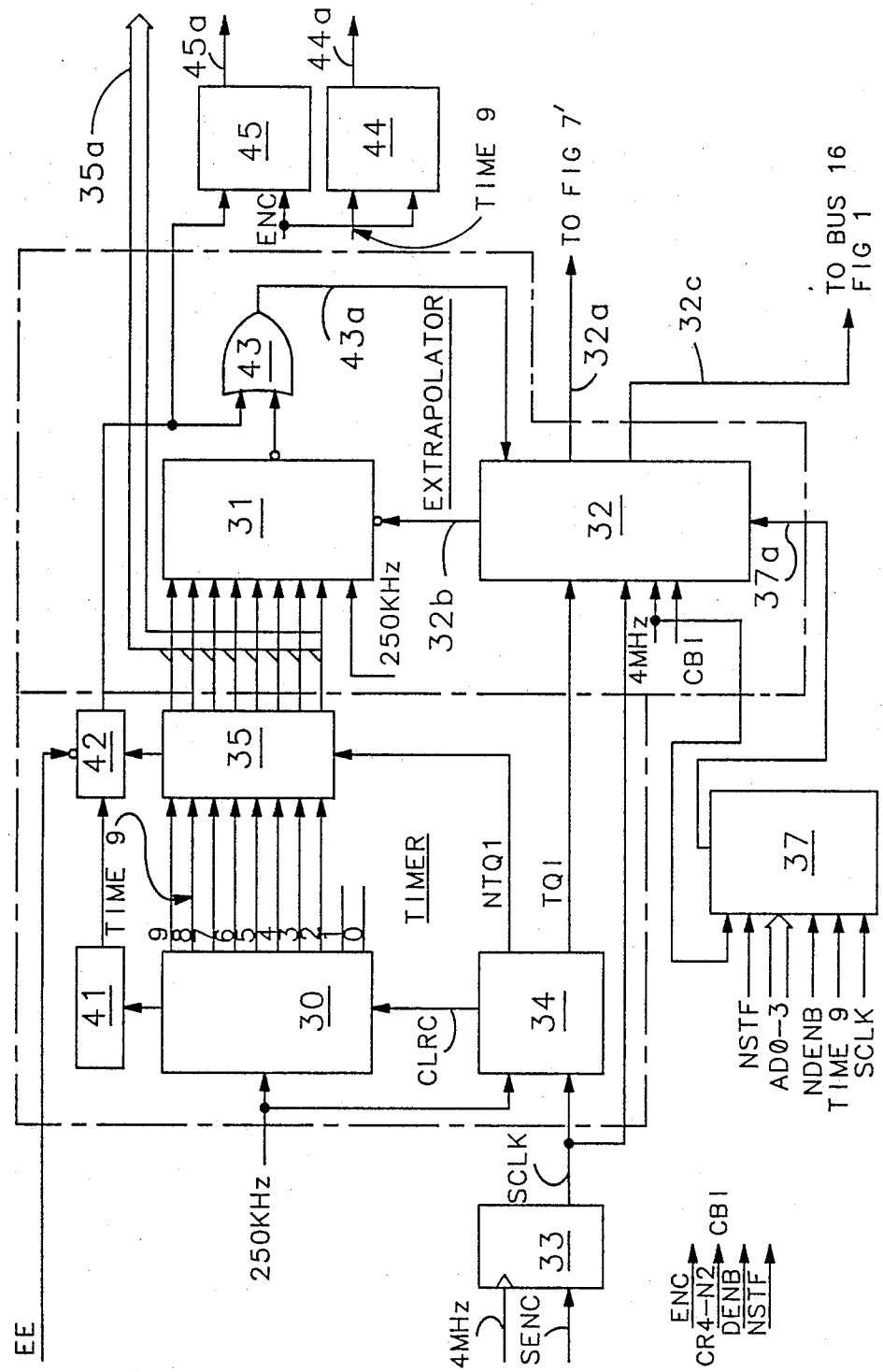
Figures 7A, 7B:
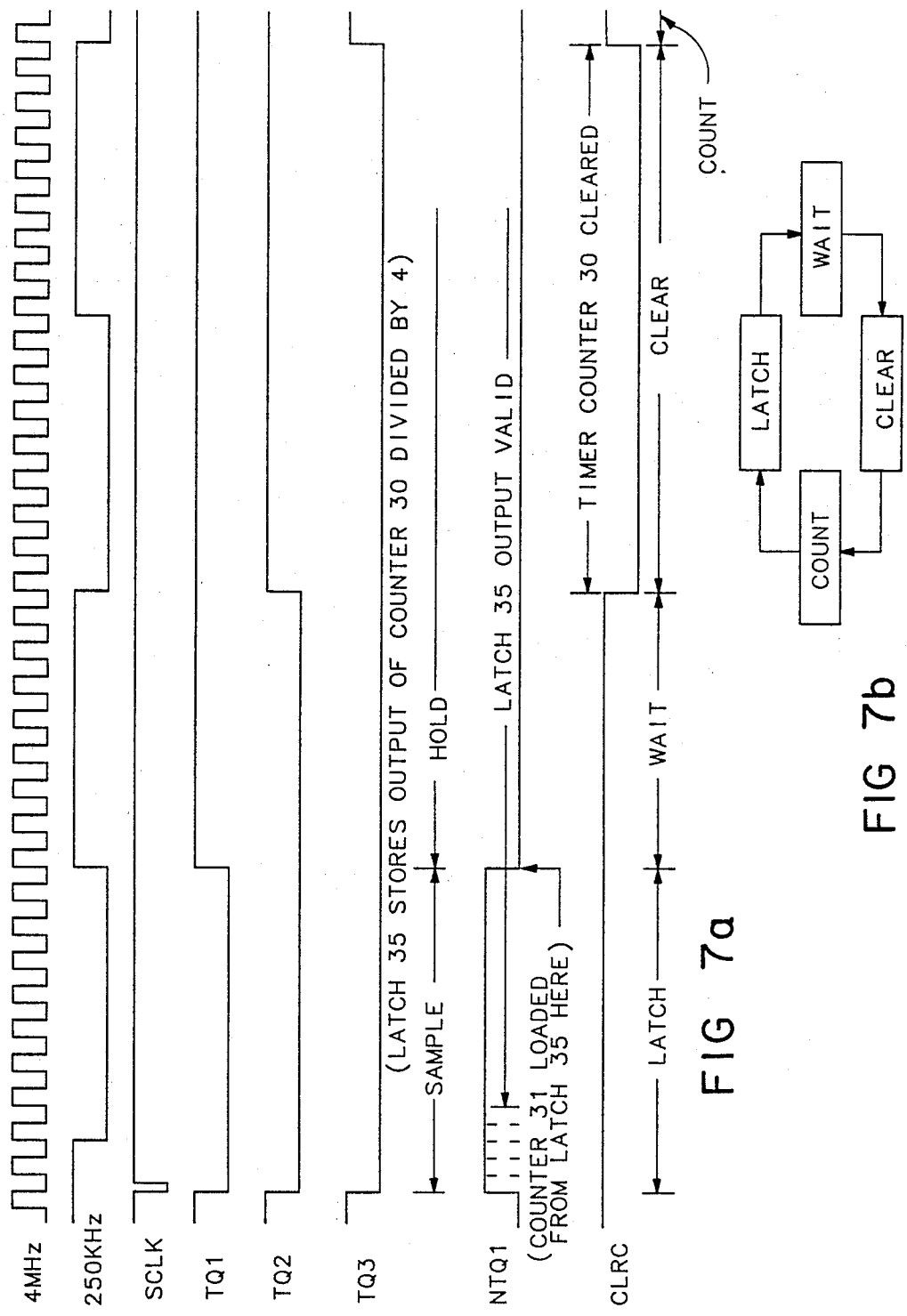
Figure 7C:
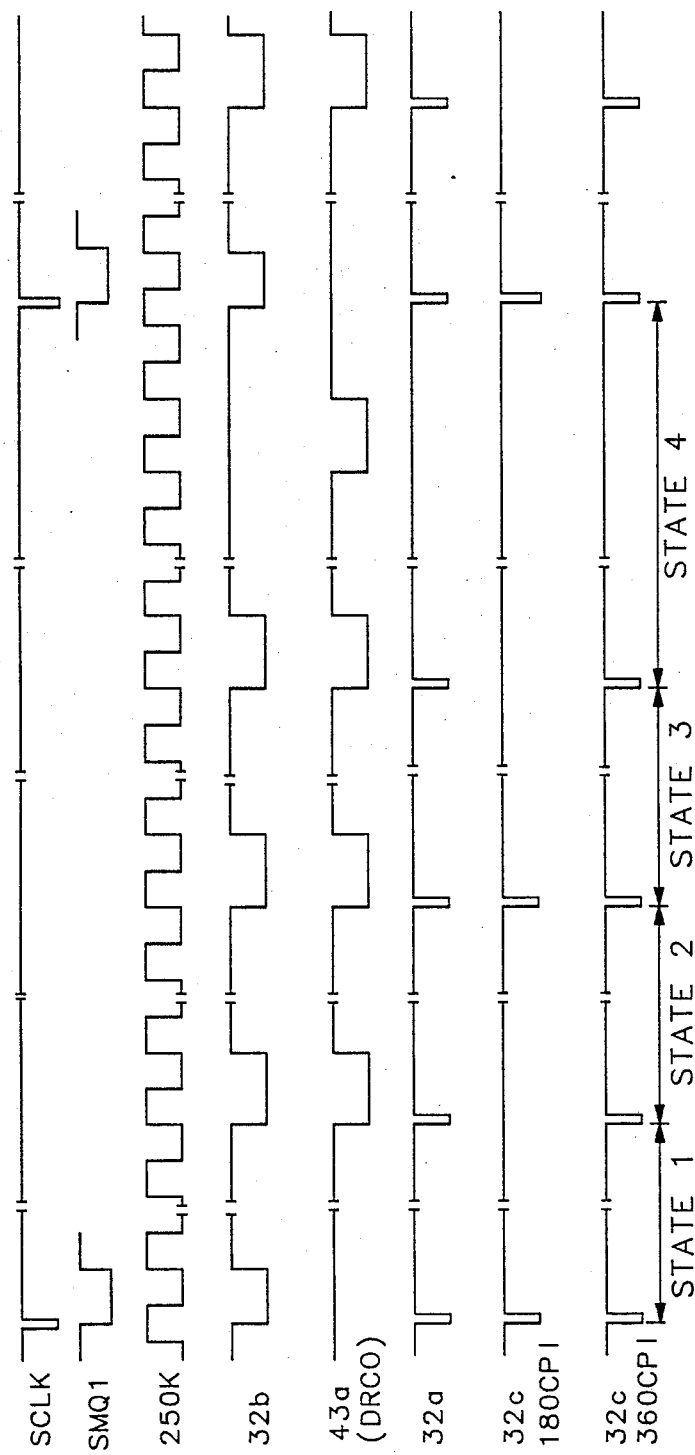
Figure 7D:
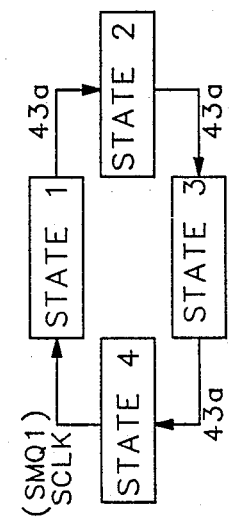
Figures 8A, 8B, 8C:
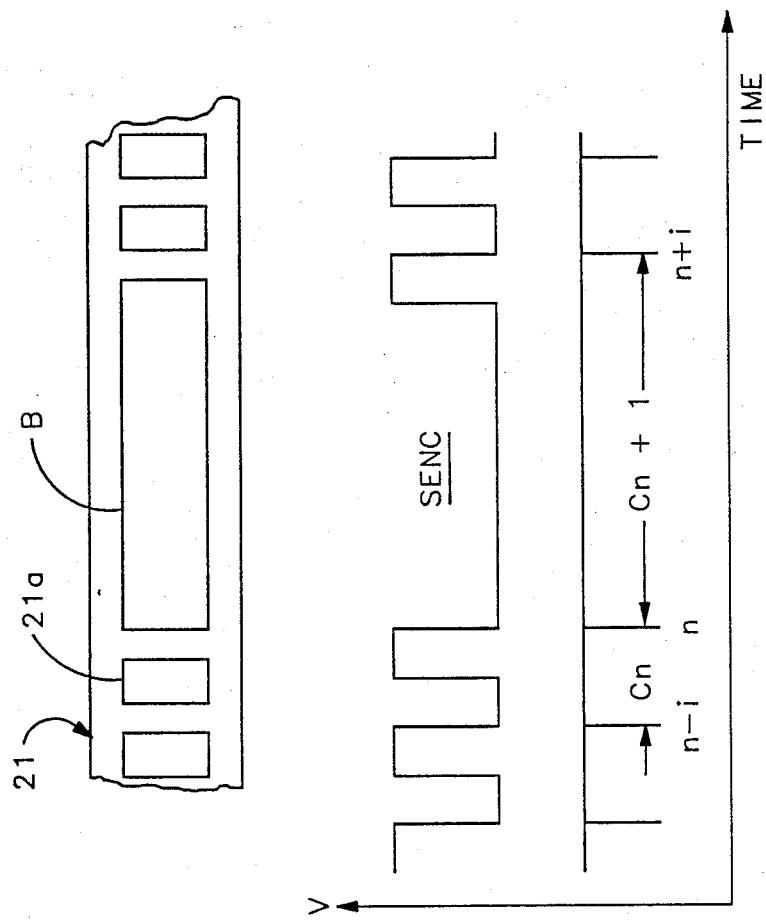
Figure 9:
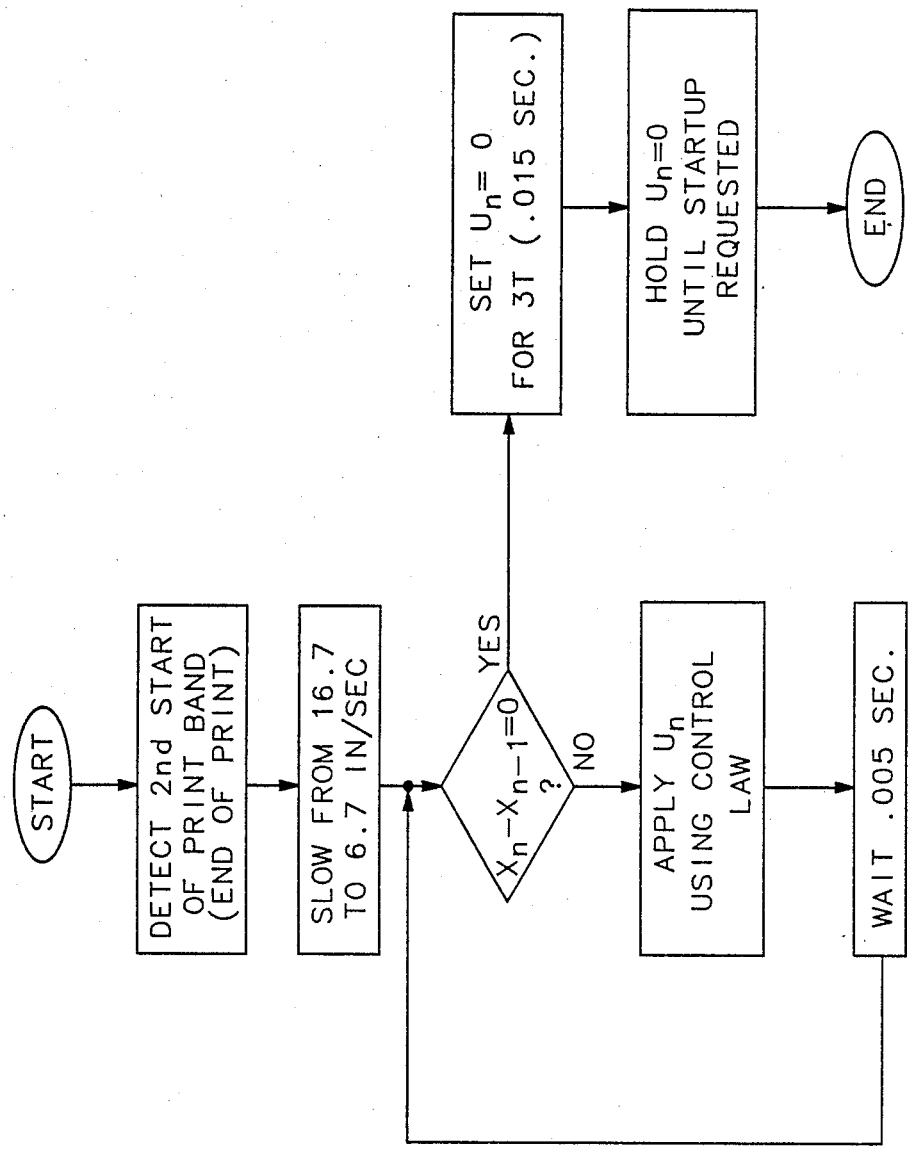
Figure 10:
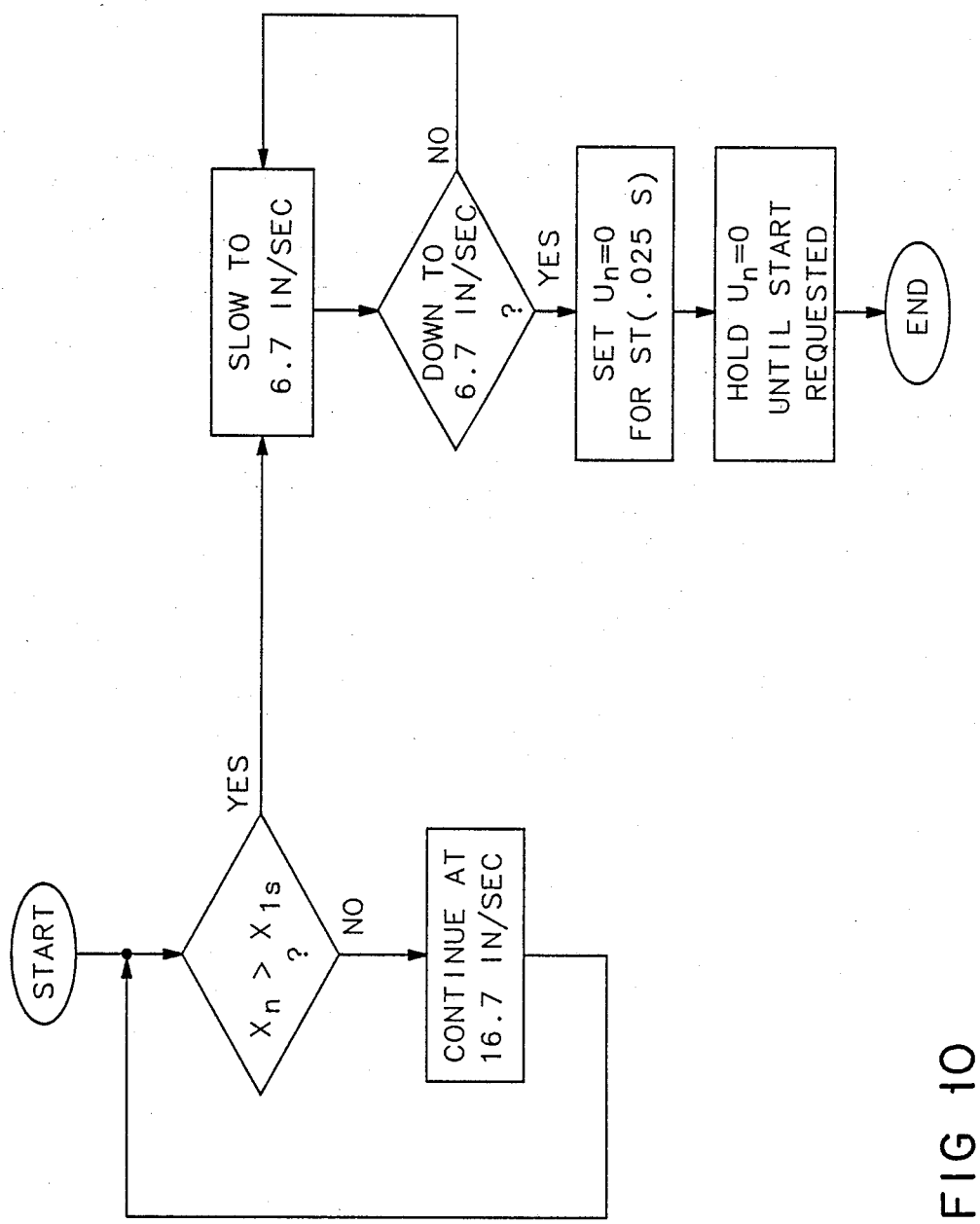
Figure 11A:
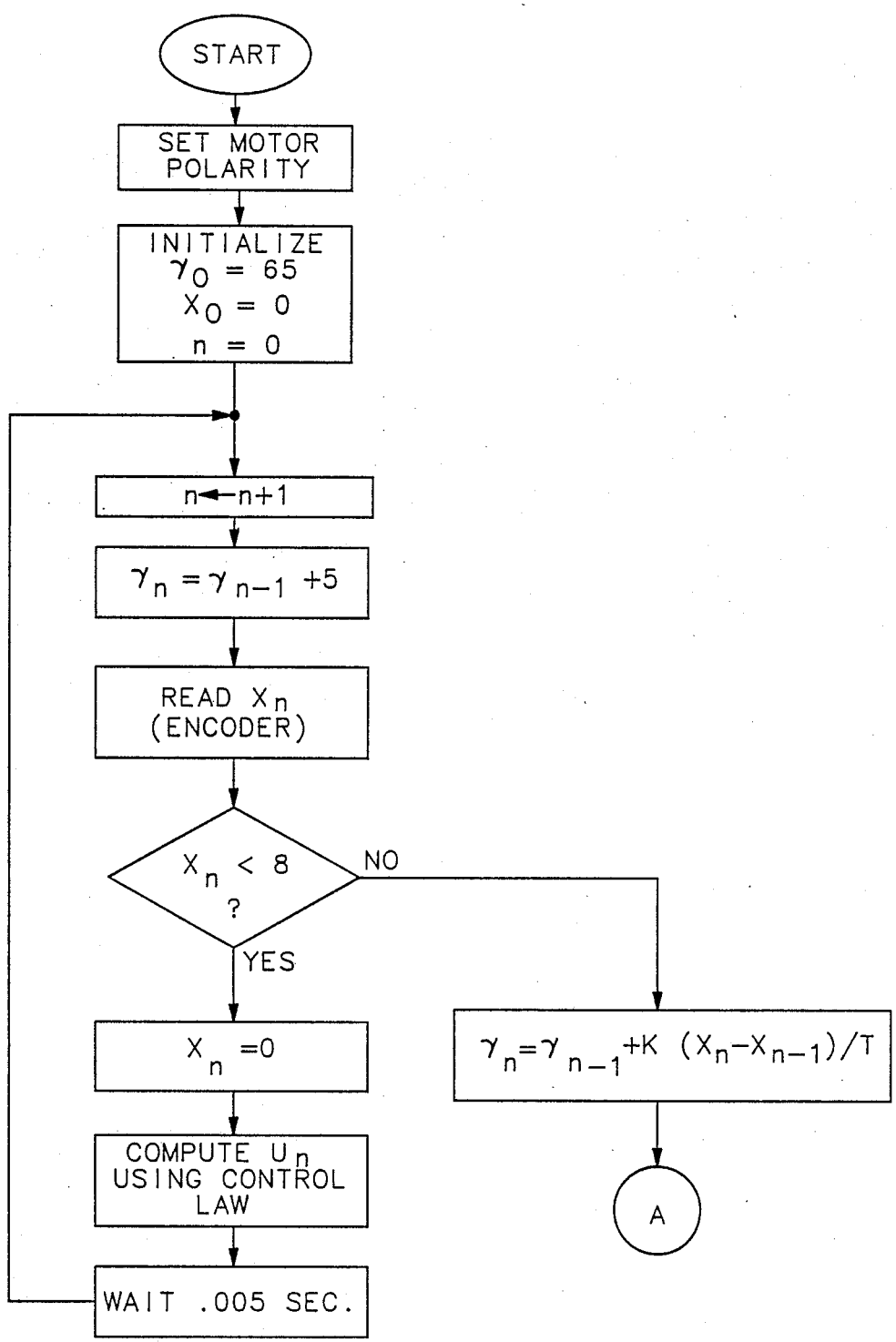
Figure 11B:
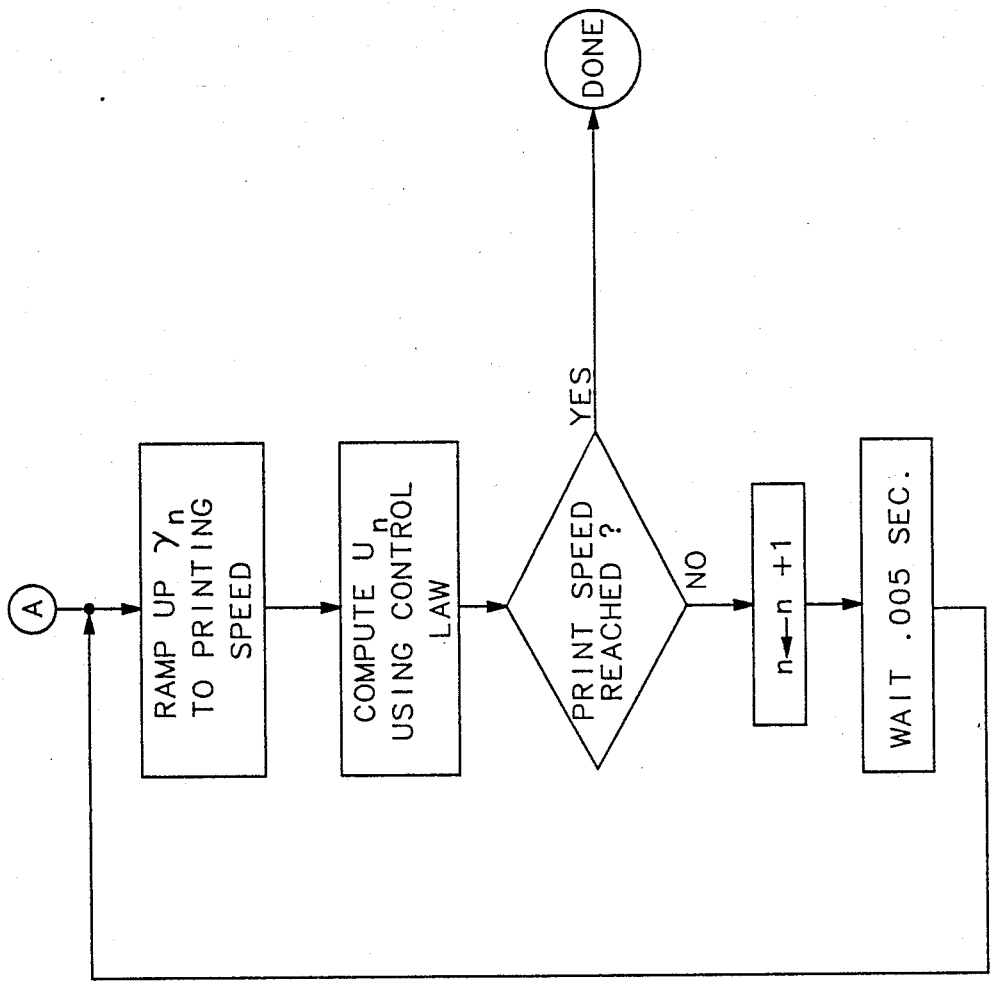
Figure 12:
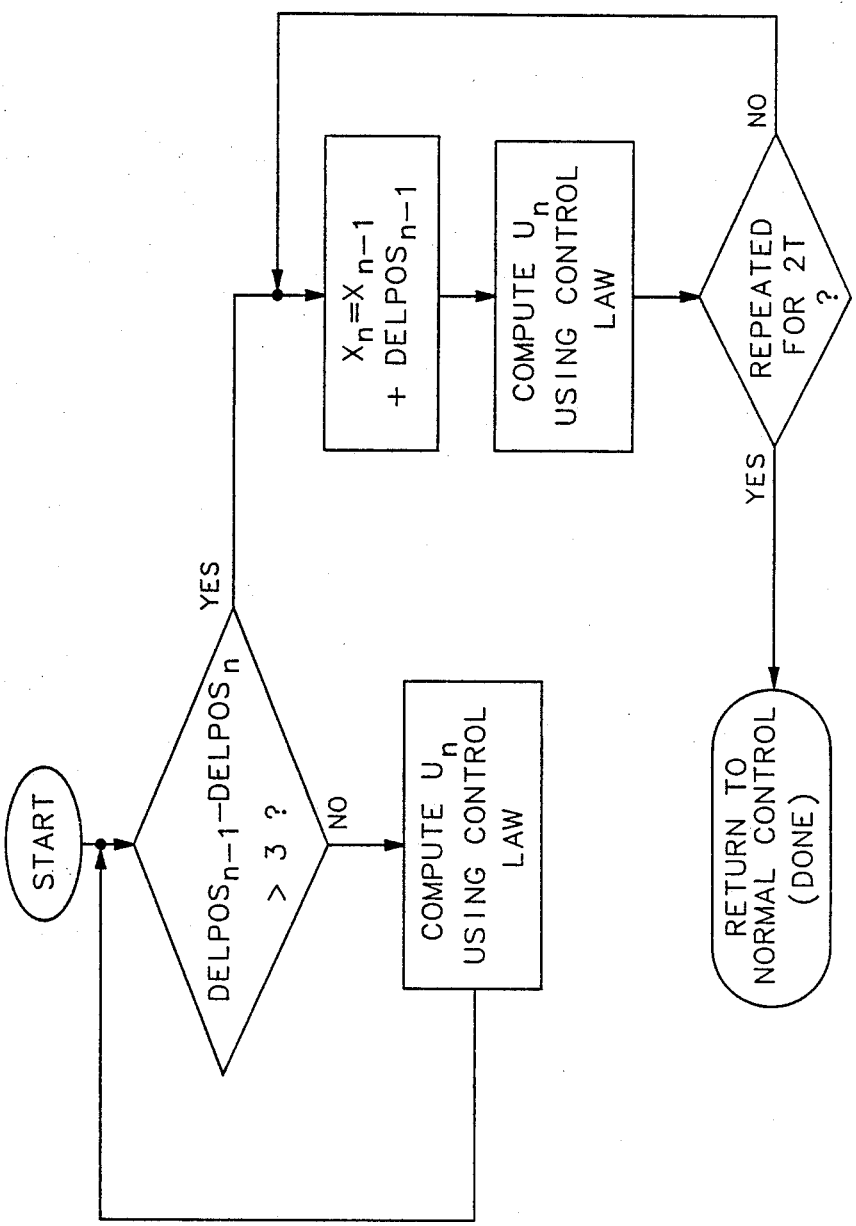

FIGS. 7 and 7' are a block diagram of an extrapolator circuit employed in this system;

FIGS. 7a, 7c, 7e and 7f are timing signal diagrams, while FIGS. 7b and 7d depict function modes of timer and extrapolator control circuits, of the extrapolator of FIG. 7;

FIG. 8a depicts an enlarged fragmentary section of the tape at a start-of-print marker;

FIG. 8b illustrates a typical detector or encoder output signal adjacent to and at a start of print marker or print limit band;

FIG. 8c illustrates the processed signal output at the scale location depicted in FIG. 8a, that is, at the print limit band;

FIG. 9 is a flow chart illustrating the process for controlling the deceleration and stopping of the carriage in sweep limit band;

FIG. 10 is a flow chart depicting the process for controlling carriage deceleration and stopping of the carriage during logic seeking;

FIGS. 11a and 11b together are a flow chart depicting the process for reversing carriage movement and acceleration the carriage to printing speed; and;

FIG. 12 is a flow chart illustrating compensation and control of carriage speed just as the printing or plotting area is being entered at the start-of-print band.

BEST MODE FOR CARRYING OUT THE INVENTION

The single channel encoder control system of this invention is useful for controlling carriage motion in a printer or plotter, for example. In such applications the carriage carries printing or marking devices, such as a thermal inkjet pen or printhead, back and forth across a media at which such a pen fires patterns of ink drops, thereby producing text and/or graphics on the media. Since the drops are fired at regularly spaced intervals, the carriage speed is necessarily proportional to the ink drop firing frequency. The thermal inkjet pens have an upper limit on ink drop firing frequency and thus impose a speed limit on the carriage. Also variations in carriage speed while printing or plotting is taking place can adversely affect print quality, thereby requiring regulation of carriage speed to within a specified tolerance of the desired printing speed. Additionally, carriage motion must be well controlled during phases other than printing or plotting, such as carriage reversal at the ends of travel, such as the end of a printing sweep, carriage acceleration to printing speed from a sweep limit, and moving the carriage to its rest or park position which is located at an outer limit of carriage movement.

General Control System

The invention is illustrated in its application to a printer to simplify its description. Its application, however, is more general, as in plotters or machine tools, for example. Thus, printing commands and other signals associated with the following specific description, will be recognized more generally as work commands and signals, associated with particular applications.

Figure 1:
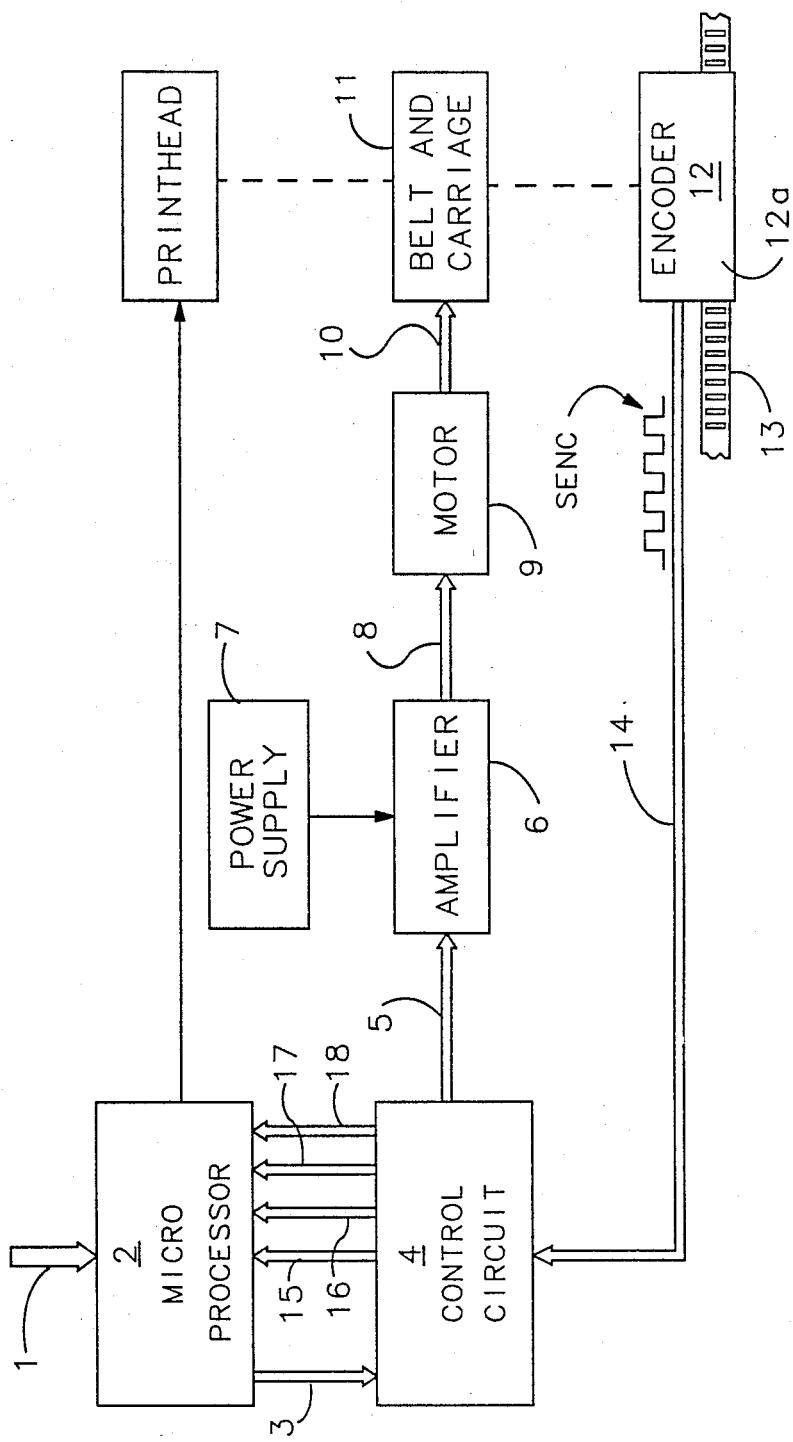
FIG. 1 is a block diagram of a single channel encoder control system embodying the principles of this invention.
Figure 3:
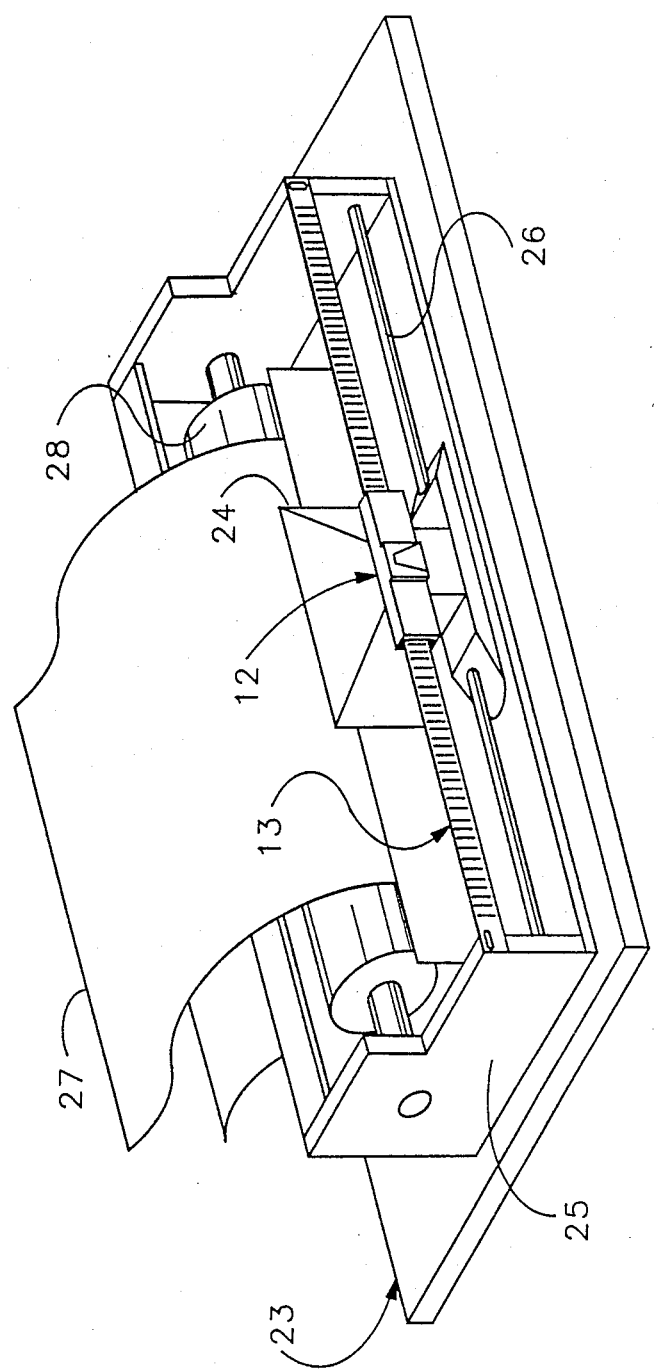
FIG. 3 is an isometric illustration of the application of the single channel encoder in the carriage axis of a printer or a plotter.

FIG. 1 is a schematic of the overall control system. Printing or plotting data, forming part of command data, may be supplied from an instrumentality such as a computer (not shown). This printing data is applied as input 1 to a microprocessor 2. In response to this input, as well as to other inputs, yet to be described, the microprocessor produces control signals which are coupled as input by a bus 3 to a control circuit 4 which has multiple functions. The control circuit 4 produces a pulsewidth modulated signal which is coupled by circuit 5 to a pulse width modulation amplifier 6 supplied with power from a power source 7. The amplifier 6 transforms and amplifies the input signal to produce a drive voltage coupled by a circuit 8 to a motor 9. In one preferred application for printing, as described herein, the motor 9 is a DC motor functioning as a print carriage drive motor. The motor 9 drives a mechanism, such as a pulley and belt system, connected to a print carriage 11 to move the carriage in its axis. An encoder 12, comprising an encoder body 12a and an encoder scale 13, responds to carriage motion. The encoder scale 13, FIG. 3, is secured at its ends to the printer chassis in a position spanning and paralleling the carriage axis. The encoder body 12a, which is mounted on the carriage, has a detector which scans the scale 13 as the carriage moves in its axis. Scale count signals SENC as well as signals indicative of start-of-print or end-of-print, carriage sweep limits, etc., which are produced by the encoder, are coupled as feedback, via circuit 14, to the control circuit 4. Control circuit 4 which also includes an extrapolator, yet to be described, produces scale count signals of doubled or quadrapled resolution of the actual scale divisions. The bus 15 couples the start-of-print and end-of-print signals to the microprocessor. The bus 16 couples the double resolution signals, and, upon selection, the quadruple resolution signals to the microprocessor for controlling print drop firing. The bus 17 couples the quadruple resolution signals to the microprocessor for use in computing motor control voltages. Sweep limit signals from the encoder are coupled to the microprocessor by the bus 18 for use in stopping and reversing the carriage drive.

The microprocessor produces desired position signals and compares the desired position signals and the actual carriage position signals. Using a feedback control law, the microprocessor computes the required control signal for the motor. This process is repeated 200 times per second, for example, and provides the basis for control of carriage speed.

This control is accomplished by this system using only a single channel incremental position encoder as the feedback element, as distinguished from the dual channel incremental position encoders of the prior art, as described hereinabove. This encoder offers the advantages of simplicity, low cost, and ease of assembly, as compared to the dual channel or quadrature incremental position encoders. Because of its measurement limitations, unique provisions are required in the control system to compensate for these limitations. Unique system features include an extrapolator, as a part of the control system, for increasing encoder resolution. Another unique feature is a print limit detect system which provides an absolute position reference at which work, such as ink drop firing, is to commence or to terminate. Additional features include provisions for detecting limits of carriage movement and for compensating for measurement limitations and feedback disturbances which inhere in the single channel encoder. These unique features and their incorporation in the control system are discussed hereinafter.

Single Channel Encoder

FIG. 2 is a perspective view of a single channel optical encoder of the type employed in this invention.

There follows, in connection with FIGS. 2, 3, 4a and 4b, a description of the single channel encoder believed to be sufficient for an understanding of its application and function as a part of the single channel encoder control system of this invention.

The single channel encoder 12 comprises two major components; these are the encoder strip or scale 13 and the encoder unit or detector 12a which reads the scale 13. As shown in FIGS. 2, 4a and 4b, the scale 13 has a pattern of closely spaced opaque lines 13a, FIGS. 4a, 4b, defining the scale. These are overlaid on a clear base strip of material. The scale 13 passes through the encoder unit or detector 12a which reads or detects the scale divisions 13a and converts or encodes the scale pattern into an electric logic signal SENC, which is a time varying voltage, idealized as a square wave signal in FIG. 2. Digital electronics utilize this logic signal to determine from its frequency the rate of relative motion between the scale 13 and the encoder body 12a and from its count the encoder position along the scale 13 from a reference position. Only one such logic signal is produced (as opposed to the quadrature signals in the case of the quadrature encoders discussed above) which is why the encoder is labeled single channel. The logic signal provides information useful in determining carriage position and rate of movement in the carriage axis. Although not shown, the encoder body contains a scale detector comprising an IR light source as the emitter on one side of the transparent scale and an IR detector on the other side. The detector produces an electrical logic signal SENC as seen in FIG. 2, indicating high or low light intensity as it traverses the scale divisions. Each line, 13a, on the scale 13 serves to block transmission between the emitter and the detector when centered in the light path, that is on a line connecting the emitter and the detector, thereby initiating a logic low level signal at the detector, otherwise transmission occurs and the detector or encoder signal output will be high.

A typical installation of the single channel encoder 12 in a printer is shown in FIG. 3. Here, a printer 23 has a pen carriage 24 and a printer chassis 25. The pen carriage 24 carries print heads such as ink jet pens or other marking or machining devices (not shown). The pen carriage 24 is mounted on a carriage track 26 and sweeps with the carriage across the printing medium or paper 27 which in turn, in a printing operation, is advanced incrementally by a drive (not shown) including a platen 28 on the printer chassis 25. Paper movement is in a direction orthogonal to the carriage axis. The encoder scale 13 is mounted at its ends on the printer chassis 25. The encoder unit 12 rides on the pen carriage 24. Movement of the pen carriage 24 causes a corresponding movement of the encoder unit or body 12 with respect to the encoder scale 13, thereby providing a logic signal for use in the measurement of the change in pen/carriage position with respect to the printer chassis, as well as the rate of movement. Since the body 12a of the encoder 12 is on the pen carriage 24, the count of scale divisions derived from its signal SENC provides a direct measurement of encoder position in the carriage axis as opposed to shaft encoders which measure rotation of the motor or of the lead screw driving the carriage.

An enlarged fragmentary view of the scale 13 is illustrated in FIG. 4a. FIG. 4a is not to scale and is intended only to provide a general indication of the layout of the scale. The scale 13 is provided with sweep limit bands or marks A. These define the limits of carriage movement during a printing or plotting operation. It is in these areas that the carriage is stopped and reversed. Print limit bands B within the span of the sweep limit bands A and of lesser dimension longitudinally of the scale than the sweep limit bands or marks, define the limits of printing. A resting or parking band C is provided at the right hand end of the scale as viewed. Holes are provided in the ends of the scale for fastening to the printer chassis at the ends of the carriage axis. The opaque marks 13 defining the scale divisions vary in number between the marks or bands B, the bands B and A and the bands A and C. The space between the print limit bands or marks B defines the limits of printing and are spaced to suit the desired width of print, that is the desired length of a line of print on the printing medium. The space between the sweep limit bands or marks A and the print limit bands or marks B is sufficient to decelerate the carriage and to stop the carriage within a sweep limit band or mark and thereafter to accelerate the carriage to printing speed, as it crosses the scale divisions between the sweep limit band or mark A and the print limit band or mark B. The distance between the rest or parking band C and the adjacent sweep limit band A is sufficient to clear the carriage from the print media or paper.

FIG. 4b which is an enlarged detail of the location L on the scale 13 of FIG. 4a, being drawn approximately to scale, provides a better indication of the opaque markings on the scale.

Figure 5A:
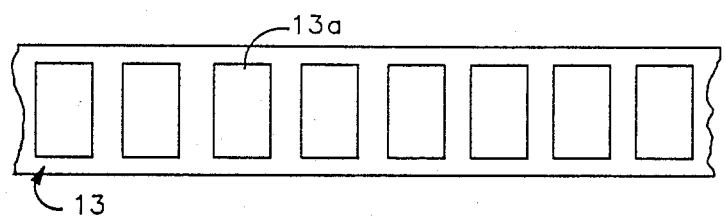
FIG. 5a is an enlarged detail of the encoder scale.
Figure 5B:
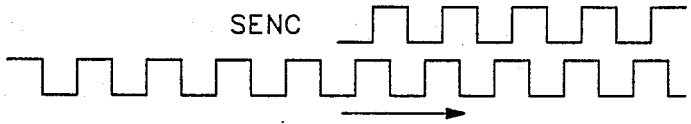
Figure 5C:
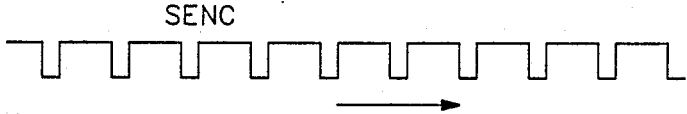

It is apparent, that as the encoder body 12a is moved with respect to the scale 13, the variations of the encoder output signal SENC coincide with the opaque scale division pattern on the encoder scale. This is seen is FIGS. 5a, 5b, and 5c, respectively, illustrating a section of the encoder scale 13 with the transverse opaque lines and three different encoder output signals SENC. In this discussion the higher level of the encoder output signal is referred to as "on" and the lower level of the encoder output signal is referred to as "off." The on and off times of the encoder output signal SENC vary from unit to unit, as seen in FIGS. 5b and 5c, due to mechanical and optoelectronic tolerances. However the signal period will accurately reflect the spacing of scale division bands on the scale. For this reason the control circuit only responds to the falling edges in the encoder signal output SENC, thereby obtaining a very accurate count of scale divisions per inch of the scale. Scale divisions are measured between corresponding edges of the opaque transverse lines 13a. In one practical embodiment of this invention, there are 90 scale divisions per inch, thus each scale division, as illustrated in FIG. 5a, represents 1/90th of an inch. As will be seen, the falling edge of the encoder output signal occurs as an edge of a transverse opaque line moves into the light path. Viewing FIGS. 5b and 5c, as the encoder detector 12a scans the scale 13 moving to the right, the falling edges in the two encoder output signals (FIGS. 5b and 5c) coincide with the corresponding leading edge of each of the transverse opaque lines 13a. When the encoder moves in the reverse direction, to the left, as seen in the upper signal in FIG. 5b, the falling edge of the signal shifts to the other edge, now the leading edge, of the opaque transverse lines 13a, but the scale division remains the same dimension, as reflected in the encoder output signal, but has shifted in position by an amount approximately equal to the width of one of the opaque transverse lines. Thus the signal period always accurately reflects the spacing of the transverse opaque lines on the strip. The shift in signal timing is not noticable in the print.

While the single channel encoder 12 provides an accurate measurement of position change it has several measurement limitations which have an affect upon control system design. For many applications, a resolution of 90 counts per inch, for example, will be too low. It is not presently cost effective or practical to double or quadruple the physical scale divisions to try to solve this problem, as would be required. In a printing application employing a thermal ink jet, a minimum of 180 counts per inch of scale is needed for firing of the ink drops. Since the encoder count is used for firing of ink drops as well as speed control, higher resolution of the scale must be provided. Moreover, scale resolution greater than 180 counts per inch is desirable from a control standpoint. This is because the control law employed in implementing the control system estimates speed as the change in position over the sample period of the servo which is in the neighborhood, for example, of 5 milliseconds. If the position is known to only 1/90th of an inch then the uncertainty in speed is 1/90th of an inch/0.005 seconds, or 2.2 inches per second. Precise control of carriage speed is complicated by this uncertainty which can be avoided by increasing resolution of the scale.

Both problems are handled by the extrapolator referred to in the discussion with respect to FIG. 1. The extrapolator is described at a later point. The extrapolator is an electronic circuit, forming part of the control circuit 4 of FIG. 1, which increases the scale count, that is provides scale counts intermediate the scale counts provided by the encoder.

Another limitation of the single channel encoder is that its output provides only information that scale divisions are being traversed. There is no information in the signal per se, as in the quadrature encoder, described above, that provides a basis for determining the direction of movement, except perhaps, as noted above, for displacement of the signals by the width of a transverse opaque line between movement of the encoder to the right or to the left with respect to the scale, as seen in FIG. 5b. The signals in FIGS. 5b and 5c look the same. There are two problems associated with this. First, it causes an instability in the servo if the carriage should change direction unexpectedly. The problem associated with this situation and its solution are described at a later point. The other situation associated with this unexpected change of carriage direction is that the absolute position of the carriage is no longer known. This creates problems for print registration and for limits on carriage motion at the ends of its sweep range. The problem presented by the lack of information in the encoder output signals is handled by superimposing the additional marks or bands A, as seen in FIG. 4a, which are the sweep limit bands, in pre-determined spaced positions beyond the print limit bands B on the scale. These print limit bands B are sensed by a circuit in the control circuit 4 of FIG. 1, while the sweep limit bands A and the parking band C are detected in the microprocessor with firmware implemented algorithms. These detection methods are described along with techniques to compensate for the interruption of the scale count signal from the encoder which these bands create in the context of speed control.

Extrapolator

The roll of the extrapolator is to increase the resolution of the scale count produced by the encoder signal.

Figure 6A:
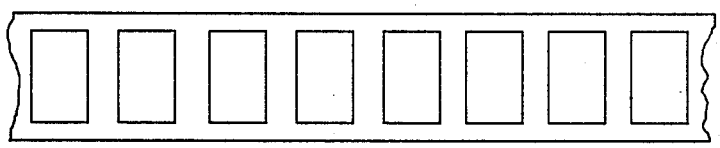
FIG. 6a depicts the encoder scale.
Figure 6B:
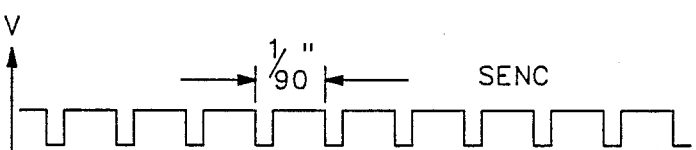
Figure 6C:
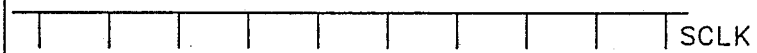
FIGS. 6c, 6d, 6e illustrate respectively scale count, double resolution scale count and quadruple resolutions scale count signals produced by the extrapolator of this invention.
Figure 6D:
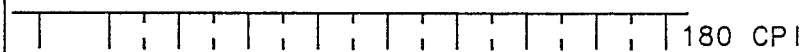
Figure 6E:
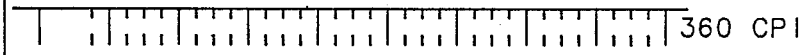

Two scale count signals, as seen in FIGS. 6a through 6e, in addition to the encoder signal SENC are produced. The first signal FIG. 6d, is a scale count signal of 180 counts per inch of scale for a 90 count per inch encoder output. This signal is used for thermal excitation for ink drop firing. The second signal FIG. 6e, is a scale count signal of 360 counts per inch of scale, which provides position and velocity feedback for the control system. These signals of FIGS. 6a–6e will be discussed in greater detail as the discussion of FIG. 7 develops.

Functionally, the extrapolator, which is illustrated in the block diagram of FIGS. 7 and 7', uses the encoder logic or output signal SENC, representing scale divisions, to produce two output signals which are respectively, double and quadruple the frequency of the encoder signal. Because of this function in using a reference signal SENC to produce extra signals before the next reference signal occurs, the circuit is called an extrapolator. The extrapolator, as seen in FIG. 7, comprises a timer section and an extrapolator section, both of which are clocked in synchronism with the encoder signal. The timer section produces a count output once during each clock period. This count output, divided by four, is latched into the extrapolator which counts out the latched in counts and produces a recycling signal three times within a clock period, to recycle the latching and counting operation. When the carriage is moving at a constant printing speed, the latching/counting intervals produce three pulses which are equally spaced in time, with each other and with the initial clock signal. When combined, these pulses provide four pulse signals per scale division.

The timer section comprises a count up timer counter 30, a timer control 34 which cycles through four states per clock pulse, and a latch circuit 35 which samples and holds the timer counter count, divided by four, throughout a clock period.

The extrapolator section comprises an extrapolator counter 31, loaded from the latch circuit 35, which counts down under the control of an extrapolator control circuit 32.

System clocking as seen in FIG. 7 is provided by a start clock signal SCLK produced by a filter circuit 33 which receives the encoder signal SENC.

The relationship of the various signals which have been referred to is seen in FIGS. 6a–6e. Here the relationship of the signal SENC to the scale 13 is seen. The start clock signal SCLK is a negative going pulse, which in practice is delayed by 750 ns, in synchronism with the falling edges of the encoder signal SENC. FIGS. 6d and 6e, respectively, illustrate the timing of the 180 cpi and 360 cpi signals.

The timer control circuit 34 and its function will be understood by reference to FIGS. 7a and 7b. The timer control circuit is described as a state machine having four functional states, as seen in FIG. 7b. These states in sequence are Latch, Wait, Clear and count and time the extrapolator system functions. FIG. 7a shows the timing signals and their relationship. FIGS. 6b and 6c show the relationship of the start clock signal SCLK to the encoder signal SENC. FIG. 7a shows the relationship of the start clock signal SCLK to the 4 MHz and 250 KHz signals which drive the counter of FIG. 7, and, the timing of the timing counter signals with respect to the start clock signal SCLK, as well as indicating their function.

Timer signals TQ1, TQ2 and TQ3 are initiated by the negative going leading edge of the start clock signal SCLK. The signal TQ1 occurs once in each clock period, as seen in FIG. 7c, and is used to initiate the extrapolation cycle synchronously with the start clock signal SCLK. The signals TQ2 and TQ3 are internal to the timer control circuit 34.

The signal NTQ1 is the compliment of the signal TQ1 and enables the latch to sample (Latch) the count of the timer counter 30 as it goes high at the time of the signal SCLK. At the time of the start clock signal SCLK, the signal TQ1 switches to its low voltage state and remains there for one-half of the 250 KHz signal. This holds off (wait) loading of the extrapolator counter 31. The timer counter 31 has completed it count. Its count is in the latch 35 and the latch output is valid shortly after the signal NTQ1 goes high. The latch stores the timer counter count divided by 4. When the signal TQ1 goes high the extrapolator control 32 produces signal 32b to load the extrapolator counter 31 from the latch.

The timer control 34 also produces a clear counter signal CLRC (clear) that exists in its low voltage state for one cycle of the 250 KHz signal. It is initiated synchronously with the signal TQ2 switching to its high voltage state and terminated synchronously with the signal TQ3 switching to the higher of its two voltage states. This function occurs one-half of a 250 KHz cycle after the extrapolator counter 30 is loaded. This clears (signal CLRC) or resets the timer counter 30 and with the termination of the clear signal CLRC the count up cycle (counts) of the timer counter 30 begins again. Thus the four states of the timer control circuit 34 are accomplished.

The extrapolator counter 31 is also driven by the 250 KHz signal. Signal TQ1 coupled to the extrapolator control circuit 32 produces the signal 32b which loads counter 31 with the latch count. At the time the latch count is loaded, the count down begins. FIG. 7c shows the time relationship of signals in the scale count extrapolator process. The signal data is based upon data between two start clock signals SCLK, i.e., one clock period. At the signal scale of FIG. 7c the full count cycle between the start clock signals SCLK cannot be drawn, so the drawing has been fragmented between the extrapolator counter count cycles.

When the extrapolator count down is completed its output coupled to a gate 43 produces a signal 43a coupled to the extrapolator control circuit 32, resulting again in the negative pulse of the counter loading signal 32b. The latch contents are again loaded into the extrapolator counter 31 and the count down begins again. The count cycle continues two more times and then terminates until the next start clock signal SCLK occurs.

The extrapolator control circuit 32 produces two output signals. These are the extrapolated scale count signals 32a and 32c, respectively representing 360 scale counts per inch and 180 scale counts per inch. These are formed in the extrapolator control circuit 32 by combining the start clock signal SCLK with the three pulses of signal 32a resulting from the three pulses of signal 43a, and by combining the signal SCLK with the single pulse of signal 32a, produced by the second pulse of signal 43a, to form the 360 cpi and the 180 cpi signals 32a and 32c respectively. The signal 32a is coupled to a position counter 36 forming part of a position register (FIG. 7') at the extrapolator output and its output is coupled to a latch 38 when the position count is fixed. The 360 cpi count is coupled to bus 17 of FIG. 1 and the 180 cpi count is coupled to bus 16 of FIG. 1.

The spaces depicted in FIG. 7c between the last extrapolated pulse 32a and 32c and the next start clock signal SCLK are shown larger than those between the initial signal SCLK and the following extrapolated pulse. Because of the fragmented nature of this signal timing diagram only the timing between signals in each section is evident. When the carriage is moving at printing speed the signal periods are equal in time.

The position counter 36 sums the pulses from the timer control 32 into a binary number which can be read by the microprocessor to be used as feedback for control purposes in the control system of FIG. 1. The extrapolator comprises part of the control circuit 4 of FIG. 1. The timer counter 30 of the extrapolator is a 10 bit counter, bits 0-9, and runs at 250 KHz. The timer counter 30 saturates if the falling edges in the 90 counts per inch signal (start clock SCLK) are more than 4.1 ms apart ($2^{10} \times 1/25,000$ sec). Saturation occurs for carriage speeds below 2.7 inches per second. Under these conditions extrapolation stops and the 360 count per inch signal becomes 90 counts per inch. This represents a feedback disturbance and compensation for it is described in the flow charts which follow at a later point.

Figure 7E:
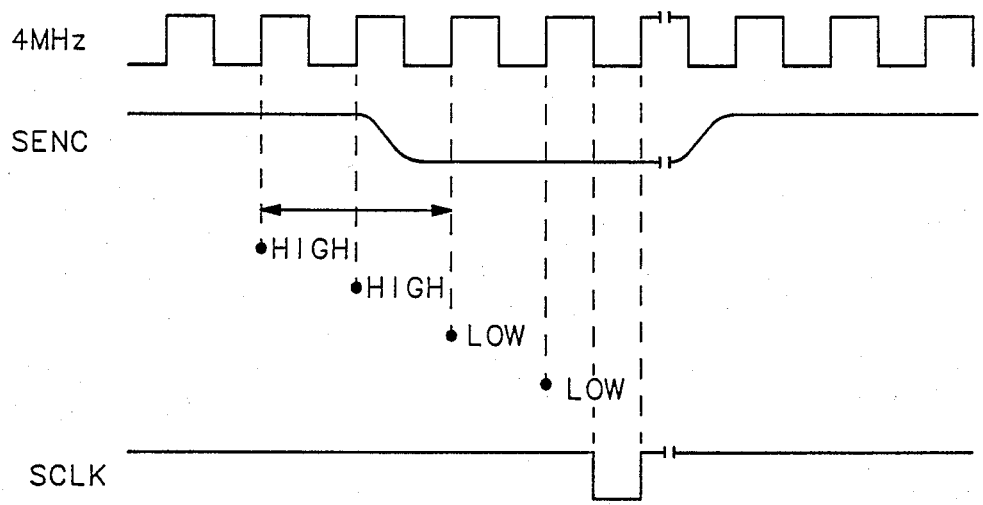

Thus the function of the extrapolator circuit is to count the encoder's transitions and, as seen in the timing signal diagrams, to add one count between encoder transitions to form the 180 count per inch signal and to add 3 equally spaced counts between the encoder transitions to form the 360 count per inch signal. The filter circuit 30 filters out any variations in the encoder input signal SENC less than 250 ns (one 4 MHz cycle) long. The 1 to 0 transition which is the negative going transition of the encoder output signal SENC produces the signal SCLK which clears the timer control circuit 34, the resulting output signal CLRC of which resets the timer counter 30, initiating a new count cycle. Because of the filter 33, the start clock signal SCLK, see FIG. 7e, is delayed and the timer counter cycle is delayed (signal CLRC) 750 ns (three 4 MHz clock cycles) after the negative going transition of the encoder signal SENC. Thus the function of the filter 33 is to output a start clock pulse signal SCLK to the extrapolator control 32 and to the timer control 34 following a falling edge of the encoder signal SENC, if the encoder signal SENC had been high about 500 ms prior to a falling thereof if the encoder signal SENC remains low at least 500 ms. Thus the start clock pulse SCLK is synchronized with the 4 MHz and 250 KHz clocks.

In further detail of the extrapolator, after the timer control 34 is reset, it generates the signal NTQ1 to load the count of the timer counter 30 (divided by 4) into the latch circuit 35. Then by signal CLRC the timer counter 30 is cleared so that it can again count the time between pulses. Prior to this, the signal NTQ1 initiates the signal 32b which loads the latch count into the extrapolator counter 31. At this point the extrapolation counter 31 begins to count down to zero, driven by the 250 KHz clock. With the production of signal 43a the extrapolation count begins again. With the production of signal 43a the extrapolation control circuit 32 generates a pulse, called the servo count pulse 32a, which increments the position counter 36. The extrapolator control circuit 32 also generates the dot firing signal 32c which is coupled to the microprocessor for coupling to the thermal inkjet printhead (not shown). The signal 32c as seen in FIG. 7c is a negative going one-shot signal generated each time a column of dots is to be fired by the thermal inkjet printhead. The timing of this pulse is such that it occurs at each negative going transition of the signal SENC, and at either (1) all extrapolated points or (2) only the second one, depending on a control bit signal CBI (1 for 360 dots/inch, or 0 for 180 dots/inch). The signal CBI is selectively placed in its 1 or 0 representing electrical state depending upon the dot firing density which is desired.

Figure 7F:
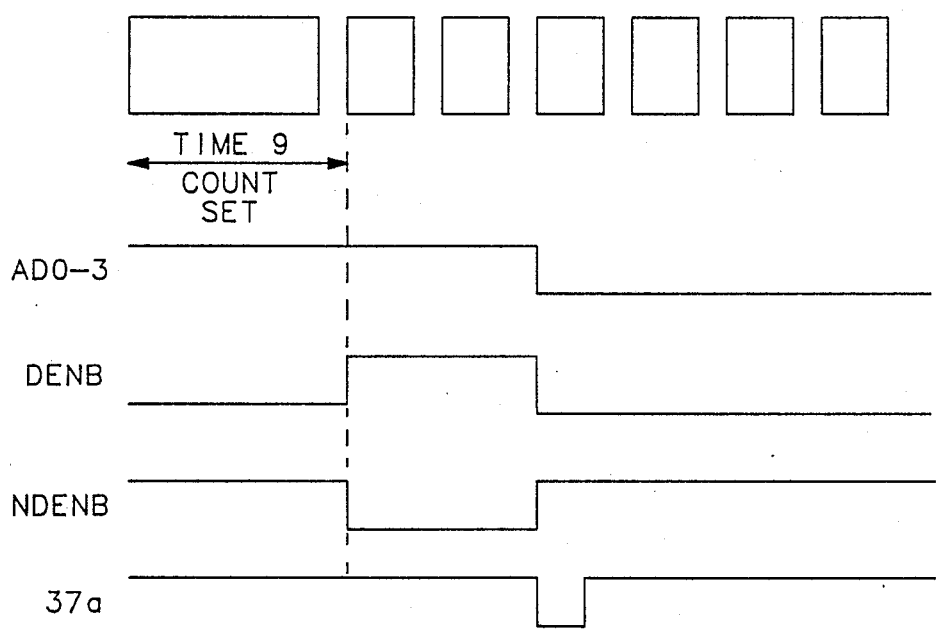

There is an active enable signal DENB provided in the extrapolator controller 32 for controlling the signal 32c. Control of the timing of the signal 32c, that is, the point in time where the signal 32c begins, is provided by a dot fire enable circuit 37 comprising a count down timer. As seen in FIG. 7f, the circuit 37 is only enabled to count once by the start clock signal SCLK for each negative transition of the input signal SENC, beginning with the detection of the print limit band B, (start-of-print), on the scale. When the count of this counter in the dot fire enable circuit 37 reaches zero it produces a signal 37a which is coupled to the extrapolator controller 32 for the purpose of enabling the dot firing signal 32c. Reference band B, it will be recalled, is detected by a large count in the timer counter 30, as shown by the Time 9 interval in FIG. 7f, indicating a large distance between the negative going portions of the signal SENC. Large count as here used means that the large count signal LC on circuit 8 of the timer counter 30, which is actually bit 9 (Time 9) of the timer counter, is in the higher of its two electrical states. This count situation occurs when there is more than 2.05 ms between pulses.

To keep the position count at the position counter 36 from changing while the output is being read, a latch circuit 38 is provided. The count in the latch circuit 38 is secured by a signal from a gate circuit 39. The gate circuit 39 is controlled by the servo count signal 32a and the output signal of a bi-stable circuit 40 controlled by the microprocessor produced encoder signal ENC. The gate circuit 39 and the bi-stable circuit 40 are clocked by the 4 MHz signal.

To keep the extrapolator from producing false extrapolated points at low speeds of the carriage (less than 3 inches per second), a rollover bit on the timer counter 30 is provided to indicate slow speed. During slow speed operation the timer counter 30 counts up to its full 10 bit count (saturates) and produces an output signal which is coupled to an overflow indicator 41. The output of the overflow indicator controls an overflow latch 42. The output of the overflow latch 42, normally under the control of an enable extrapolation signal EE, enables the gate 43 to couple the output signal 43a of the extrapolator counter 31 to the extrapolator controller 32. Thus the normal function of the extrapolator controller 32 in producing the servo count 32a for the position counter is enabled. Upon the occurrence of overflow however, at such time as the encoder is scanning a reference band A, B, or C on the scale, the gate 43 is disabled and the servo count is interrupted. Thus this rollover situation is latched with the timer count and keeps the extrapolator from adding the extra counts and producing the dot firing signals.

So that the system has knowledge of what has been happening and also as an aid in testing, signals are produced to indicate the function then in existence. Thus the latched timer count signal at the bus 35a, representing the individual signal states on the circuits 2 through 9 of the timer counter at the output of the latch circuit 35, provides an indication of the state of the counter 30. A bi-stable circuit 44 produces a signal on circuit 44a, which is in the lower of its two electrical states in response to the microprocessor produced encoder signal ENC on its reset terminal, and, is in the higher of its two electrical or voltage states, in response to the signal LC (Time 9) on its set terminal. In the higher of its two voltage states, the output signal on circuit 44a indicates that a reference band A, B, or C on the scale has been detected. Indications of overflow occurring during the last interrupt cycle are provided by a signal on circuit 45a produced by a bi-stable circuit 45, which along with the gate circuit 43, is also controlled by the output signal of the overflow latch 42.

Start of Print Detection

A start-of-print (or end-of-print) detection system provides a reliable reference position from which ink drop ejection or placement is based. The detection system is needed because measurement limitations in the single channel encoder together with saturation in the extrapolator's circuit introduces uncertainty in the position information based on the 90 counts per inch data alone. The detection system comprises the pair of wide opaque print limit bands B on the encoder scale as seen in FIG. 4a, plus a detection circuit forming part of the extrapolator circuit which is described herebelow. The start-of-print system also functions as an end-of-part detector.

Functionally, the start of print detection system recognizes a delay in the period between the negative going edges of the encoder signal SENC. It is integrated into the timer counter 30, which has been described above, and works as follows: As shown in FIG. 8, the start-of-print band B (print limit) causes an unusually long period between the negative going edges (4 times normal) of the encoder signal SENC. The 10 bit extrapolator timer counter 30 measures the period in 1/250,000 second increments (4 ms). Normally, at print drop ejection speed, the period is about 1/90 inch/16.7 inches per second or 665 ms. This gives a counter value of 166 (665 ms/4 ms). Since this number is less than $2^8$ (256), the two most significant bits in the 10 bit period counter are typically 0 (they represent $2^8$ and $2^9$), this allows the most significant bit of the counter to be used as the start of print detection point, since when this bit goes from 0 to 1 in its electrical state it signifies a longer than normal period. Referring to FIGS. 8a, 8b, and 8c, in the time interval Cn, the normal count of the timer counter 30 before the start of print band is 166. In the interval Cn+1, which is the time interval spanning the start of print band B, it will be seen that the time is 4 times as long as the time interval, Cn. In terms of count intervals this represents 644 counts. Thus it is observed that the detector threshold of 512 is comfortably above the normal count of 166 in a time interval Cn and yet easily exceeded by the start-of-print band count of 664. The timer counter 30 thus counts to its maximum value in the start-of-print or print limit band B and the 10 bit value is available to the microprocessor. This is the way the start-of-print (or end-of-print) detection, using the print limit bands B, is communicated to both the control system and to the ink drop firing system. As seen in FIG. 1, this output of the encoder is communicated via circuit 14 to the control circuit 4 and the bus 15 called the start-of-print bus from the control circuit 4 to the microprocessor, communicates this information to the microprocessor. The microprocessor has knowledge that printing is in progress or is not in progress at the time a marker band B is encountered. If printing is in progress, the microprocessor knows that printing is to be stopped. If printing is not in progress the microprocessor knows that printing is to be initiated. Print cycles are initiated synchronously with the first falling edge of the encoder signal SENC when the encoder (and the printhead) are moving out of a print limit band B and is stopped with the last falling edge of the encoder signal occurring when the marker band B is encounted by the encoder when coming out of the print band and encountering a print limit band B.

Control Law

In FIG. 1, the microprocessor is identified as the component of the circuit that generates control signals for the motor (bus circuit 3) based on the print data input, the motion of the carriage being sensed and incrementally detected by means of the single channel encoder. The control law which is used by the microprocessor for providing the control signals for the motor and incorporating the output of the single channel encoder as feedback in the control system, is discussed herebelow, particularly in reference to compensations made to the control law because of the limitations in the information content in the output of the single channel encoder. It is helpful to consider the control law so that the need for the compensations and the character of the compensations can be appreciated. The control algorithms are described in connection with flow charts and also in reference to the extrapolator circuit of FIG. 7 and the control system of FIG. 1. The algorithms are typically implemented as stored instructions (firmware) for the microprocessor of FIG. 1.

The objective of the control system is to control the speed of the carriage as it sweeps back and forth between the sweep limit bands A on the scale and throughout the print distance defined between the print limit bands B on the scale. In particular, the speed needs to be constant to within a specified tolerance while printing between the print limit bands B. Also the carriage needs to decelerate and to stop and to accelerate to printing speed in the distance between the print limit bands B and the sweep limit bands A. These different types of carriage control can all be expressed as a desired position of the carriage with respect to time r(t). Since the carriage speed and acceleration are dr(t)/dt and $d^2r(t)/dt^2$, respectively, they are intrinsically defined by how the desired position r(t) changes with respect to time.

The control system functions by applying a motor control voltage u(t) to a direct current motor, such as the motor 9 in FIG. 1, in such a way that the carriage position x(t) follows the desired carriage position r(t). This is a sampled data system, which means it does this at discrete, regularly spaced points in time T units long. For this reason, the desired position r(t) equals r(nT) is referred to as $r_n$, where n is an integer. Likewise x(nT) is referred to as $x_n$ and u(nT) is referred to $u_n$. The control process first computes a desired position $r_1$. The single channel encoder is read to obtain the present carriage position $x_1$. Based on this information a motor control voltage $u_1$ is computed and is applied to the motor. T seconds later, the process is repeated, giving desired position, present position, and voltage $r_2$, $x_2$ and $u_2$, respectively. After n periods, present position, desired position, and motor control voltage, are $r_n$, $x_n$, and $u_n$. In this case, the sample period T is 0.005 seconds, so the process repeats 200 times per second. For a properly designed control system, the present position $x_n$ will follow the desired position $r_n$ in a controlled, predictable way.

The microprocessor of FIG. 1, which implements the control law, computes the motor control voltage $u_n$ based on the values of the desired position $r_n$ and the actual or present position $x_n$. The control law is defined below:

$$U_n = K_p(r_n - x_n) - K_v V_n$$

$$V_n = (x_n - x_{n-1})/T.$$

These expressions define a position controller with velocity feedback. The expression $(r_n - x_n)$ defines the difference between the desired and actual positions, or the position error. This position error is multiplied by the position gain $K_p$ to determine its contribution to the motor control voltage $u_n$. The term $V_n$ is an estimate of velocity based on the change in measured position over one sample period divided by the sample period. It is multiplied by the velocity gain $K_v$ for its contribution to motor voltage.

This control law has been chosen because of several desirable properties. The first is that the actual carriage speed will converge to the desired speed with no steady state error. This means that printing speed will be the desired speed in the presence of friction or other disturbances. The second is its simplicity which results in efficiency from the standpoint of the microprocessor's computational load.

The inventive improvements reside in the control system for controlling the printhead which makes this control law work with the single channel encoder. It is clear that the motor control voltage $u_n$ depends a great deal on the measured position $x_n$ (and $x_{n-1}$, in computing the estimate of velocity $V_n$). If there is some error in $x_n$, the wrong motor control voltage $u_n$ will almost certainly result. Because of measurement limitations in the single channel encoder of FIG. 2 which is employed herein, several errors are introduced on a regular basis. One is the inability of the encoder to produce signals indicative of direction. This could result in mistaking a decreasing actual position $x_n$ for an increasing one. Another, is crossing over a print limit band B, causing a loss of counts and an error in determining the actual or present position $x_n$. A third possibility of error occurs if the timer counter 30 of the extrapolator saturates, causing only one count to be produced for every 1/90 inch of carriage motion instead of 4 counts. Still another error possibility is crossing any limit band where the single channel encoder stops measuring position altogether, which occurs in the wide carriage limit bands A, B and C on the encoder scale. Each of these conditions requires compensations to be made to maintain smooth control of carriage speeds. These adjustments or compensations allow the use of the single channel encoder and represent key design features in the control system and in the firmware.

Control Near Zero Speed

As mentioned, the single channel encoder introduces two errors in the measurement of actual position $x_n$ at speeds approaching zero speed. The first is the lack of direction information. At very low speeds it is possible for the carriage to change direction. The single channel encoder produces no indication of this change in direction. In this case the actual position $x_n$ would be interpreted as increasing when in fact it is decreasing. This causes the control system to become unstable with a resulting loss of control, because the control law has no way of recognizing this change in direction. The second problem is saturation in the timer counter 30 in the extrapolator of FIG. 7. At speeds below 2.7 inches/second, the 10 bit period counter 30 overflows in the time interval between the falling or negative going edges of the detector signal SENC, causing the extrapolator circuit to shut down. In this situation, the feedback signal via circuit 15 to the microprocessor in FIG. 1, changes from 360 counts per inch to 90 counts per inch. Since the control law continues to interpret the feedback signal as 360 counts/inch, the drop in the number of counts is taken as a drop in carriage speed. The control system responds by applying more voltage to speed up the motor to speed up the carriage. The speed of the carriage increases until it exceeds 2.7 inches/second, at which time the extrapolator starts to function again, sending 4 times as many counts. This leads to a strong deceleration until the speed drops below 2.7 inches/second, at which point the above sequence starts again. The result is a very undesirable oscillation about a speed of 2.7 inch/second.

Both of the above problems, according to this invention, are avoided by keeping the carriage speed well above 2.7 inches/second. This isn't possible when the carriage must be brought to a stop either to end a line of printing or to turn around in a sweep limit band for another sweep. In this case the problems are avoided by not allowing the control law to function normally. In this case, the loop is opened which is another way of saying that the actual position $x_n$ is no longer used as feedback. The details of this differ in slowing to a stop and accelerating from a stop so they are described separately below.

Stopping

The case of slowing to a stop is considered first. This occurs in two situations. The first is moving from an encoded area of the scale having 90 bands per inch into one of the carriage sweep limit bands A or the parking band C as seen in FIG. 4a. In traversing these bands, the encoder detects no transitions and therefore there is no scale count feedback in the control system of FIG. 1 during the band traversal interval. The other situation involves logic seeking, where because of a short line of print the carriage is commanded to turn around in the encoded area between the print limit bands B. The general steps are the same in both cases for bringing the carriage to a stop but the details are different so they are described separately.

The case of stopping in a carriage limit band A or a parking band C is considered first. FIG. 9 illustrates the method whereby this stopping function is achieved. The approach is signaled by the single channel encoder as the carriage crosses the second start-of-print or print limit band B on its way out of the printing zone. The carriage is slowed down to about 6.7 inches/second from the printing speed of 16.7 inches/second. This produces a scale count frequency which is well above the saturation scale count speed of 2.7 inches/second, of the timer counter 30 of the extrapolator, thereby avoiding a problem. The carriage continues at this speed until it enters the carriage sweep limit band A or the parking band C, as the case may be. This is immediately recognizable as a sudden drop in the scale count signals coming from the encoder, since no scale division count signals are generated in these opaque zones. In terms of the control variables, $x_n, x_{n-1}$, and so on, the change in position as measured by the single channel encoder over one sample period drops from 12 counts equivalent to 6.7 inches/second to 0 counts. This signals the firmware in the microprocessor that the encoder has entered a limit band A, or, that the parking band C has been entered. The microprocessor responds by bypassing the control law function and operating to turn off the motor, that is, the motor control voltage $u_n$ is set equal to 0. The microprocessor now waits for three consecutive sample periods, or 0.015 seconds (3 times 0.005 seconds), to allow the carriage to coast to a stop. The motor remains off until it is time to move again. This process is outlined in the flow chart in FIG. 9 wherein after the carriage crosses the second start-of-print or print limit band B at the end of print, the carriage speed is slowed to 6.7 inches/second. If the quantity $(x_n - x_{n-1})$ is equal to 0 then the motor control voltage is set equal to 0 for three consecutive time intervals T (0.015 Sec). In this situation the motor control voltage is held at 0 until start up is again requested by the user. In the alternative, if the quantity $(x_n - x_{n-1})$ is not equal to 0, the control law governs in applying the motor control voltage $u_n$. Thereafter a delay of 0.005 seconds is initiated before re-examination of the expression $(x_n - x_{n-1})$ again occurs. Motor control continues in this situation as long as the expression $(x_n - x_{n-1})$ is not equal to 0. The implementation of this algorithm or logic concept as firmware in the microprocessor bypasses the control law at any point in time when the speed is equal to 0.

The use of the carriage limit bands A, B, and C is evident. They are easily detected as described and avoid the encoder's measurement limitations by effectively turning it off. Also by driving the carriage until a limit band is detected, there is assurance that the carriage is inside the band. The provision of sufficient scale divisions between the sweep limit bands A and print limit bands B guarantees that there is enough space for the carriage to be accelerated to printing speed before it crosses a print limit band B at the start of a print cycle as it moves into the printing zone to resume printing. In the case of the parking band it guarantees that the carriage has reached its parking position.

Continuing with carriage deceleration control, deceleration in logic seeking is now described. Logic seeking refers to stopping and reversing the carriage between the print limit bands B. Refer to FIG. 10. In this situation, there is no limit band to detect. Instead, a position threshold $x_{ls}$ in a line of print, is called for by the microprocessor. When this position is reached, the carriage again slows from 16.7 inches/second to 6.7 inches/second. When the carriage reaches this lower speed, the microprocessor again functions to bypass the control law and the motor is turned off by returning the motor voltage $u_n$ to 0. In this case the microprocessor waits for 5 time intervals (5 T, 0.025 second) to allow the carriage to come to a stop. As seen in FIG. 10, if the actual position $x_n$ is not greater than the called for position $x_{ls}$, then the microprocessor continues to control the motor so that carriage motion takes place at 16.7 inches/second, but if the actual position $x_n$ is greater than the called for position $x_{ls}$ the microprocessor initiates carriage deceleration to 6.7 inches/second. As seen in the decision block which follows, the microprocessor monitors carriage speed and continues the deceleration function until the carriage speed reaches 6.7 inches/second. At this point in time the micro processor functions to bypass the control law and reduces the motor control voltage to 0. The motor control voltage is held at 0 for 5 time interval (5 T) to guarantee that the carriage is stopped. At this point the polarity of the control applied to the motor is changed. The acceleration algorithm described below (FIGS. 11a and 11b) is applied to move the carriage back towards the print limit band B it has just crossed. Once the print limit band is detected the deceleration algorithm in FIG. 9 is applied. This leaves the carriage in the limit band A waiting for a new line of print.

Acceleration

The procedure for acceleration from rest up to printing speed is described below in reference to FIGS. 11a and 11b. Acceleration occurs both in exiting a carriage sweep limit band A or the parking band C and in stopping and turning around during logic seeking. Unlike the differing control logic for each of the deceleration cases, the acceleration algorithm is the same in both instances.

Having stopped, as described previously, the carriage is at rest with the motor turned off. The first step is to set the polarity of the motor drive signal so that motion will be in the direction which is desired. Assume the motor polarity is reversed, this is seen in FIG. 11a as Set Motor Polarity. Since the encoder has no sense of direction of movement this must be done explicitly in the microprocessor by multiplying the motor control control voltage signal $u_n$ by either +1 or −1. This produces either forward or reverse voltage at the motor causing left-to-right or right-to-left carriage motion. This polarity of motor control voltage remains in affect until another direction change is desired, or, automatically established in a continuing printing operation in response to encoder entry of the carriage sweep limit bands A.

Once the motor voltage polarity is established the motor control voltage must be applied to the motor to initiate carriage movement. This is done by initializing the desired position reference $r_n$ in the control law to a predetermined count, say 65 counts, ($r_o = 65$) for example, and thereafter advancing the desired position reference 5 counts ($r_n = r_{n-1} + 5$) every sample period in which no movement is detected. Recalling the control law as:

$$u_n = K_p(r_n - x_n) - K_v(x_n - x_{n-1})/T$$

the affect of this procedure can be seen. Until the carriage starts to move, $$x_n = x_{n-1} = 0$$

so $$u_n = K_p(r_n - 0) - K_v(0 - 0)/T = K_v(r_n)$$

$$r_n = r_{n-1} + 5$$

so a voltage of $K_p(r_n)$ will be applied to the motor. This voltage will slowly increase each sample period (5 counts per sample period T). By doing this, carriage motion is assured, since eventually the motor control voltage will become high enough to start carriage movement even if the motor is weak and friction is high. On the other hand it allows a small initial value of voltage to be used so as to not result in overdrive of the motor in the case of a strong motor in a low friction environment.

Once carriage motion starts the carriage position count signal, $x_n$, is no longer 0 because the encoder begins to generate scale count signals. This occurs quickly for logic seeking since the carriage is entering into a scale division encoded area of the encoder scale. Otherwise, there will be a delay as the carriage moves across a carriage limit band A or the parking band C before entering an encoded area. In either case, the carriage speed may be low when the first counts occur, in which circumstance the problems of low speed instability and extrapolator saturation exist. These were discussed above. These problems can be avoided during acceleration by not using the carriage position count signals $x_n$ in the control law until the carriage speed is high enough to avoid the two problems. This is done as seen in FIG. 11a by forcing the actual position $x_n$ to be equal 0 until its count value reaches 8. Thus, if the actual position count value $x_n$ is less than 8, $x_n$ remains at 0. The motor control voltage $u_n$ is computed by the microprocessor using the control law. After each computation of the motor control voltage $u_n$ a 0.005 second delay is imposed and the cycle is repeated as indicated in FIG. 11a until the actual position count $x_n$ is greater than 8 representing the crossing of 8 scale divisions by the carriage and encoder in one period T. The speed of the carriage at this point is evident from a consideration of the following: The estimated speed is determined from the change in position over the sample period, or $$V_n = x_n - x_{n-1}/T$$

a value of $x_n - x_{n-1} = 8$ is equivalent to a speed of 4.5 inches/second. Until scale count signals from the single channel encoder are generated, $x_{n-1} = 0$ so $V_n = x_n/T$. If the micro-processor reads a value of $x_n$ less than 8, it resets the value of $x_n$ to be equal to 0 which also holds $x_{n-1} = 0$. This is seen in FIG. 11a. As long as both $x_n$ and $x_{n-1}$ are held at 0, velocity feedback is 0 and the actual carriage position count has no affect as feedback in the control system because the control loop effectively is open:

$$u_n = K_p(r_n - x_n) - K_v(x_n - x_{n-1})/T = K_p r_n$$

As seen in FIG. 11a, when $x_n$ becomes 8 or greater, its value is accepted and feedback becomes active. This is evident in FIG. 11a from the decision block marked $x_n < 8$. Furthermore, speed is known to be high enough to avoid errors in the actual position count $x_n$ due to the single channel encoder. In this way, the control loop of FIG. 1 is automatically closed only when the feedback from the single channel encoder is accurate and useable.

Closing the loop in this way has one drawback which must be compensated for. In the sample period just before the scale count $x_n$ is used for feedback, the motor control voltage was $u_n = K_p r_n$. In the next period when the scale count signal $x_n$ is used, the computed voltage would be $$u_{n+1} = K_p(r_{n+1} - x_{n+1}) - K_v(x_{n+1} - x_n)/T$$

The affect of including these additional terms is to decrease the motor control voltage $u_{n+1}$. This is because the expression $K_v(r_{n+1} - x_{n+1})$ is about equal to $K_v(r_n)$, but the velocity feedback term $K_v(x_{n+1} - x_n)/T$ is now being subtracted. This is undesirable since a drop in voltage will cause a drop in speed at just the time the objective is to accelerate.

The solution is to adjust the position error $r_n - x_n$ at the same time $x_n$ is introduced into the control law circuits. This can be done by adding the velocity feedback to the position error in the sample period that the switch is made. Effectively, the reference or desired position $r_n$ is increased by an amount equal to the velocity feedback as it develops:

$$r_n = r_{n-1} + K_v(x_n - x_{n-1})/T.$$

This is seen in FIG. 11a. This keeps the carriage accelerating smoothly through the transition from open loop to closed loop operation. Once the transition is made, the speed is controlled by profiling the desired position $r_n$. This is indicated in FIG. 11b in which the desired position signal $r_n$ is ramped up to result in a motor control voltage $u_n$ which will bring the carriage up to printing speed. The amount by which $r_n$ is ramped up is based upon the print speed. Print speed is 30 counts per 0.005 sec, so every 0.005 sec $r_n$ is advanced by 30 counts. At printing speed the control law functions normally to compute the motor control voltage $u_n$ using the control law as seen in FIG. 11b. In FIG. 11b, in the decision block, if printing speed has been reached, the carriage acceleration task of the control system is completed. If not, after a delay of 0.005 seconds the profiling of the desired position signal $r_n$ continues. Using that signal $r_n$, a new motor control voltage $u_n$ is computed. This cycle continues until printing speed is reached. At this point the acceleration phase is complete, and the acceleration algorithm is exited. The next step is to cross the print limit band at a start-of-print operation, as described below.

Crossing Start-of-Print Band

The roll of the print limit band B at a start-of-print operation and the circuit for its detection have been described. These print limit bands define therebetween the printing zone within which the pens are fired for ejecting ink drops, and throughout which the carriage speed is held constant. As described in connection with FIG. 8, these print limit bands also represent a feedback disturbance to the servo in that fewer counts are generated while the encoder is crossing the bands. This causes the measured position count $x_n$ to be wrong on the low side. Print limit band compensation for the control system is depicted in the flowchart of FIG. 12. Recalling from the control law that the carriage speed is estimated as $V_n = (x_n - x_{n-1})/T$, note is made of the fact that the term $x_{n-1}$ was read before the band was entered. Therefore its value is correct. However, $x_n$ developed in the band is artificially low. This leads to an error in the quantity $V_n$, which is also on the low side. The servo responds by trying to increase the carriage speed by increasing the motor control voltage $u_n$. This occurs just as the printing area is being entered, a point where carriage speed must have reached printing speed and must be held constant, and control of carriage speed is critical.

To compensate for this, the value of $x_n$ obtained while crossing the print limit band must be adjusted. First, however, the microprocessor firmware must sense that the print band has been entered. The start of print detection circuits, however, involving the timer counter 30 of the extrapolator circuit of FIG. 7, will not function until the single channel encoder is most of the way across the print limit band, which is too late. Both the detection and the compensation are aided by employing a variable delta position, called "Delpos", where $$Delpos_n = x_n - x_{n-1}$$

This expression represents the change in measured position over one sample period. Delpos is computed each period, and its value is saved for the next period as well, so that both $Delpos_n$ and $Delpos_{n-1}$ are available. $Delpos_{n-1}$ is the change in position in the previous sample period. As mentioned, in the sample period that the start of print band is entered, the actual position $x_n$ is artificially low. This is also true of $Delpos_n$ since it is computed using $x_n$. By comparing it with the previous value, a change signifying start of print band can be seen. Specifically, if $$Delpos_{n-1} - Delpos_n > 3,$$

then the micro processor firmware has an indication that the start-of-print or print limit band B has been entered. This is indicated in the decision block in FIG. 12. This is a valid indication because a change of this magnitude could not normally happen during one sample period.

Having detected entry of the print limit band, the next step is to adjust the value of the actual position count $x_n$. It is known that the speed of the print carriage should be very close to the speed in the previous sample period. Therefore, $Delpos_{n-1}$ is a very good approximation for what the change in position would have been if the start of print band was not encountered. It is used to adjust the value of the actual position count $x_n$ using the correct previous value $x_{n-1}$:

$$x_n = x_{n-1} + Delpos_{n-1}$$

Using this value of the actual position count $x_n$ a new motor control voltage $u_n$ is computed using the control law as seen in FIG. 12. This compensation is applied for two sample periods (2T) to insure that the start of print band is crossed smoothly, after which there is a return to normal control. The control law, as implemented in firmware in the microprocessor, provides a motor control voltage for maintaining a constant carriage speed at printing speed across the print zone between the print limit bands B.

Although specific implementation of this invention has been described using count up and count down counters it is evident that registers or counters having counting functions reversed from those described may be substituted. Additionally it is believed to be equally evident that magnetic or capacitive encoders, or, encoders employing other physical phenomena may be substituted for the optical encoder described. Still further it is evident that the application of this invention is not limited specifically to printers but rather is applicable generally in controlling the position and velocity and direction of movement of a member in an axis of freedom.

Industrial Applicability

This control system is applicable generally in the control of a member for printing, plotting, machining, or other purpose in an axis of freedom of movement.

We claim:

1. In a device having work element means movable along a path in an axis for performing a work function within predetermined limits of movement in said axis, motor means for driving said work element means and a control system for operating said motor means in response to work commands, the improvement comprising:

a stationary scale paralleling said axis;
equally spaced marks on said scale defining equal scale divisions along said scale;
a pair of work limit bands on said scale spaced from each other on said scale, each having a dimension along said scale greater than that of each of said marks;
a scale detector connected to and movable with said work element means adjacent said scale for detecting said marks and said work limit bands;
said detector producing a time varying voltage in traversing each mark and the space adjacent thereto along said scale;
said detector producing a work limit voltage different from said time varying voltage upon detection of a work limit band, said work limit voltage existing while said detector remains in said work limit band;
means connecting said scale detector to said control system to supply said time varying voltage and said work limit voltage thereto;
means in said control system responsive to said work commands for operating said motor means to move said work element means in said axis and said detector along said scale;
means in said control system responsive to a first work limit voltage of said detector while crossing a first of said work limit bands, to initiate a work function of said work element means upon the occurrence thereafter of a time varying voltage of said detector, and for terminating said work function of said work element means upon a second occurrence of said work limit voltage off said detector when said detector detects the other of said work limit bands; a pair of sweep limit bands on said scale, each sweep limit band being disposed between a work limit band and the adjacent end of said scale and each having a dimension along said scale greater than that of each of said marks;
equally spaced marks on said scale between each work limit band and each sweep limit band, defining equal scale divisions therebetween;
said detector producing a sweep limit voltage different from said time varying voltage upon entering a sweep limit band; and
means in said control system responsive to said second occurrence of said work limit voltage for operating said motor means to decelerate said work element means and to stop said work element means in said sweep limit band in response to the occurrence and existence of said sweep limit voltage when said detector detects said sweep limit band.

2. The invention according to claim 1, comprising:
means in said control system responsive to the presence of a work command after the occurrence of said sweep limit voltage and stopping of said motor means for operating said motor means to reverse the direction of movement of said work element means; and
means in said control system responsive to said detector for applying voltages to said motor means while traversing said marks between a sweep limit band and a work limit band for accelerating said work element means to a desired speed in the space along said scale between said sweep limit band and the adjacent work limit band.

3. The invention according to claim 2, wherein:

said predetermined interval of time is about three time intervals long wherein each time interval is about 0.005 seconds duration.

4. The invention according to claim 2, comprising:
means in said control system responsive to the first occurrence of said work limit voltage during acceleration of said work element means to desired speed and after the occurrence of said time varying voltage of said detector for delaying initiation of said work function for a predetermined number of time varying voltage cycles.

5. The invention according to claim 1, wherein:
said work commands to said control system are incremental desired position commands;
said work element is an inkjet printhead;
said means connecting said detector to said control system comprising:
means responsive to said time varying voltages for producing first pulses having a pulse count per inch of scale equal to the number of scale divisions per inch of scale;
means responsive to said first pulses for producing second pulses of twice the pulse count per inch of scale as the count of said scale divisions per inch of scale and for producing third pulses having four times the pulse count per inch of scale as the count of scale divisions per inch of scale;
means for applying said third pulses as feedback to said control system; and
means forming part of the last named means of claim 1 for applying said second pulses to said inkjet printhead to cause said printhead to eject ink drops when said printhead is between said work limit bands.

6. The invention according to claim 1, wherein:
said means in said control system responsive to said work commands moves said work element at constant speed in said axis between the first and second occurrences of said work limit voltage.

7. The invention according to claim 6, wherein:
said constant speed is about 16.7 inches per second.

8. The invention according to claim 1, wherein:
said means in said control system responsive to said second occurrence of said work limit voltage decelerates said printer carriage to about 6.7 inches per second.

9. The invention according to claim 1, wherein:
said carriage moves at a constant speed of about 16.7 inches per second between the first and second occurrences of said work limit voltages and decelerates to about 6.7 inches per second after the second occurrence of said work limit steady state voltage.

10. The invention according to claim 1, comprising:
means in said control system responsive to a work command to reverse said work element means after the first occurrence of a work limit voltage, for decelerating said work element means to about 6.7 inches per second, thereafter said control system holding said motor means inoperative for a predetermined time period.

11. The invention according to claim 10 comprising:
means in said control system responsive to said time varying voltages for producing four voltage pulses with the occurrence of each time varying voltage, the last named means of claim 1 being responsive to said voltage pulses in consecutive count intervals for holding said motor means inoperative for said predetermined time period.

12. The invention according to claim 11, wherein:
said predetermined time period comprises fine time intervals each of which times intervals is determined by the time between said voltage pulses when said work element means is moving at constant speed.

13. The invention according to claim 12, wherein:
said constant speed is about 16.7 inches per second.

14. The invention according to claim 12, wherein:
each time interval is about 0.005 seconds duration.

15. The invention according to claim 13, wherein:
a scale division is about 1/90th of an inch;
said constant speed is about 16.7 inches per second; and
each time interval is about 0.005 seconds duration.

16. An incremental positioning system for an inkjet printer having a printer carriage movable in a print axis, an inkjet printhead on said carriage, a scale in said axis having equal scale divisions and a scale detector on said carriage for reading said scale, comprising:
a control system coupled to said printer carriage for moving said carriage in said axis;
means for applying incremental position commands to said control system to move said carriage;
means responsive to the output of said scale detector when moving along said scale for forming first pulses having a pulse count per inch of scale equal to the number of scale divisions per inch of scale, for forming second pulses having a pulse count per inch of scale equal to twice the number of scale divisions per inch of scale and for forming third pulses having a pulse count per inch of scale equal to four times the number of scale divisions per inch of scale;
means for coupling said third pulses as feedback to said control system when the pulse rate is above a predetermined minimum pulse rate; and
means for coupling said second pulses to said inkjet printhead for causing the ejection of drops of ink.

17. The invention according to claim 16, wherein:
said predetermined minimum pulse rate corresponds to printer carriage movement of about 3 inches per second.

* * * * *

UNITED STATES PATENT AND TRADEMARK OFFICE
CERTIFICATE OF CORRECTION

PATENT NO. : 4,789,874

DATED : December 6, 1988

INVENTOR(S) : Mark W. Majette et al.

It is certified that error appears in the above-identified patent and that said Letters Patent is hereby corrected as shown below:

```
Column 3, line 23, "part" should read -- park
Column 7, line 10, "13defining" should read -- 13a defining --.
Column 9, line 57, "count" should read -- Count --.
Column 10, line 12, "wait" should read -- Wait --.
Column 11, line 30, "30" should read -- 33 --.
Column 11, line 45, "if" should read -- and if --.
Column 13, line 25, "-part" should read -- print --.
Column 13, line 51, "644" should read -- 664 --.
Column 24, line 14, "fine" should read -- five --.
```

Signed and Sealed this

Thirtieth Day of January, 1990

*Attest:*

JEFFREY M. SAMUELS

*Attesting Officer*     *Acting Commissioner of Patents and Trademarks*

UNITED STATES PATENT AND TRADEMARK OFFICE
CERTIFICATE OF CORRECTION

PATENT NO. : 4,789,874

DATED : December 6, 1988

INVENTOR(S) : Mark W. Majette; William J. Walsh; John A. Wickeraad

It is certified that error appears in the above-identified patent and that said Letters Patent is hereby corrected as shown below:

Column 3, line 51, "principals" should be --principles--;
Column 4, line 27, "acceleration" should be --accelerating--;
Column 5, line 27, "quadrapled" should be --quadrupled--;
Column 5, after line 68, insert:
--This single channel encoder is the subject of a co-pending application of Mark W. Majette, et al, Serial No. 07/077,575, filed July 23, 1987, entitled Single Channel Encoder and assigned to the assignee of this invention, and, which is incorporated herein by reference.--;
Column 7, line 8, After "fastening" insert --the scale--;
Column 7, line 34, "is" should be --in--;
Column 10, line 13, "it" should be --its--;
Column 11, line 45, "thereof" should be --edge thereof--;
Column 17, line 66, "micro processor" should be --microprocessor--;
Column 18, line 30, "affect" should be --effect--;
Column 18, line 47, "affect" should be --effect--;
Column 19, line 37, "affect" should be --effect--;
Column 19, line 59, "affect" should be --effect--.

Signed and Sealed this

Fourth Day of September, 1990

Attest:

HARRY F. MANBECK, JR.

*Attesting Officer*  *Commissioner of Patents and Trademarks*